US012286686B2

(12) United States Patent
Smit et al.

(10) Patent No.: US 12,286,686 B2
(45) Date of Patent: Apr. 29, 2025

(54) CO-PROCESSING OF COPPER SULPHIDE CONCENTRATE WITH NICKEL LATERITE ORE

(71) Applicant: Sherritt International Corporation, Fort Saskatchewan (CA)

(72) Inventors: Jan Smit, St Albert (CA); Preston Carl Holloway, Edmonton (CA); Michael Joseph Collins, Fort Saskatchewan (CA); Alain Tshilombo, Edmonton (CA); Nigel Edwin Tuffrey, Rossland (CA)

(73) Assignee: Sherritt International Corporation, Fort Saskatchewan (CA)

( * ) Notice: Subject to any disclaimer, the term of this patent is extended or adjusted under 35 U.S.C. 154(b) by 146 days.

(21) Appl. No.: 17/184,480

(22) Filed: Feb. 24, 2021

(65) Prior Publication Data

US 2022/0267877 A1    Aug. 25, 2022

(51) Int. Cl.
   *C22B 3/08*    (2006.01)
   *C01G 51/04*   (2006.01)
   (Continued)

(52) U.S. Cl.
   CPC .............. *C22B 3/08* (2013.01); *C01G 51/04* (2013.01); *C01G 51/15* (2025.01); *C01G 53/04* (2013.01);
   (Continued)

(58) Field of Classification Search
   CPC ....... C22B 23/00; C22B 23/005; C22B 23/04; C22B 23/0407; C22B 23/0415;
   (Continued)

(56) References Cited

U.S. PATENT DOCUMENTS

| 2,722,480 A | * | 11/1955 | Tuhin | .................. C22B 23/0461 |
| | | | | 423/142 |
| 2,899,300 A | * | 8/1959 | Bailey | .................. C22B 23/043 |
| | | | | 75/427 |

(Continued)

FOREIGN PATENT DOCUMENTS

| AU | 709751 B2 | 9/1999 |
| AU | 2008/100563 C4 | 2/2010 |

(Continued)

OTHER PUBLICATIONS

Michaud, L D. Pachuca Tank, Jun. 11, 2016, 911Metallurgist (Year: 2016).*

(Continued)

*Primary Examiner* — George Wyszomierski
*Assistant Examiner* — Nikolas Takuya Pullen
(74) *Attorney, Agent, or Firm* — LEYDIG, VOIT & MAYER, LTD.

(57) ABSTRACT

A process to recover nickel, cobalt and copper by co-processing copper-containing sulphide concentrate feed containing one or more of arsenic, antimony, and bismuth, and laterite ore feed containing nickel and cobalt by pressure oxidative leaching. The sulphide concentrate and oxygen are controlled to produce sulphuric acid to leach nickel, cobalt, copper and acid soluble impurities into a liquid phase of an acidic leach slurry, to precipitate iron compounds and a majority of the arsenic, antimony and bismuth as solids, and to produce heat to heat the incoming feeds to a temperature above 230° C. Reacted slurry is withdrawn, solids are separated, and the PLS solution contains the nickel, cobalt, copper and acid soluble impurities. A first solution purification stage on the PLS neutralizes free acid, precipitates one or more of iron, aluminum, chromium and silicon, and, separates as solids, the precipitated impurities and other solids from a first purified solution. Copper is separated from (Continued)

the first purified solution with a solvent extraction step to produce a raffinate solution reduced in copper and a copper loaded organic phase. The organic phase is stripped and copper is recovered with electrowinning. A second solution purification stage is conducted on the raffinate by one or both of neutralizing free acid and precipitating one or more of iron, aluminum, chromium and silicon, followed by separating as solids, the precipitated impurities and other solids from a second purified solution. Nickel and cobalt are recovered as mixed hydroxides or mixed sulphides from the second purified solution.

37 Claims, 16 Drawing Sheets

(51) Int. Cl.

| | | |
|---|---|---|
| C01G 51/15 | (2025.01) | |
| C01G 53/04 | (2006.01) | |
| C01G 53/11 | (2006.01) | |
| C22B 3/00 | (2006.01) | |
| C22B 3/04 | (2006.01) | |
| C22B 3/16 | (2006.01) | |
| C22B 3/44 | (2006.01) | |
| C22B 11/08 | (2006.01) | |
| C22B 15/00 | (2006.01) | |
| C25C 1/12 | (2006.01) | |

(52) U.S. Cl.
CPC ............ *C01G 53/11* (2013.01); *C22B 3/045* (2013.01); *C22B 3/16* (2013.01); *C22B 3/44* (2013.01); *C22B 11/08* (2013.01); *C22B 15/0071* (2013.01); *C22B 15/0089* (2013.01); *C22B 23/043* (2013.01); *C25C 1/12* (2013.01)

(58) Field of Classification Search
CPC ............ C22B 23/043; C22B 23/0453; C22B 23/0461; C22B 23/0469; C22B 3/00; C22B 3/02; C22B 3/04; C22B 3/08; C22B 3/22; C22B 3/26; C22B 15/00; C22B 15/0008; C22B 15/0063; C22B 15/0065; C22B 15/0067; C22B 15/0082; C22B 15/0071; Y02P 10/20; C25C 1/00; C25C 1/12; C01G 51/04; C01G 51/30; C01G 53/04; C01G 53/11
See application file for complete search history.

(56) References Cited

U.S. PATENT DOCUMENTS

| | | | |
|---|---|---|---|
| 3,773,891 A | 11/1973 | O'Neill | |
| 3,809,549 A | 5/1974 | Opratko et al. | |
| 4,626,279 A * | 12/1986 | Bjornberg | C22B 15/0015 75/752 |
| 6,054,105 A * | 4/2000 | Jones | C22B 19/22 423/139 |
| 6,409,979 B1 * | 6/2002 | White | C22B 23/0415 423/140 |
| 7,387,767 B2 | 6/2008 | Campbell et al. | |
| 7,563,421 B2 | 7/2009 | Kobayashi et al. | |
| 7,871,584 B2 | 1/2011 | Liu et al. | |
| 8,147,781 B2 | 4/2012 | Holloway et al. | |
| 10,544,482 B2 | 1/2020 | Buban et al. | |
| 2007/0297960 A1 | 12/2007 | Krebs et al. | |
| 2009/0078086 A1 * | 3/2009 | Hultholm | C22B 15/0089 75/743 |
| 2020/0078796 A1 * | 3/2020 | Kochhar | B03C 1/23 |

FOREIGN PATENT DOCUMENTS

| | | |
|---|---|---|
| AU | 2008/101213 B8 | 4/2010 |
| WO | WO 1996/007762 A1 | 3/1996 |
| WO | WO 1996/020291 A1 | 7/1996 |
| WO | WO 2009/149521 A1 | 12/2009 |
| WO | WO 2010/031137 A1 | 3/2010 |

OTHER PUBLICATIONS

Process Water Treatment, Mar. 13, 2010, Water Professionals (Year: 2010).*
Mindat: Calcrete, May 29, 2018, Mindat (Year: 2018).*
Dunn, G.M. Increasing the capacity of existing and new exothermic autoclave circuits, Jun. 2009, The Journal of The Southern African Institute of Mining and Metallurgy, vol. 109 p. 329-336 (Year: 2009).*
Clive John Hallett, Oxygen Mass Transfer in Pachuca Tanks, May 1981, Department of Metallurgy and Materials Science Royal School of Mines Imperial College of Science and Technology, p. 20-21 (Year: 1981).*
Ishihara S, Shinoda K, Kano J. Mechanochemical Treatment to Remove Arsenic from Copper Ore. Jun. 6, 2019; Minerals. 9(6):349. https://doi.org/10.3390/min9060349 (Year: 2019).*
Written Opinion and Search Report in International Application PCT/CA2022/050257, mailed Jun. 29, 2022.
Ferron et al., "Co-Treatment of Limonitic Laterites and Sulphur Bearing Materials as an Alternative to The HPAL Process", SGS Minerals Services—Technical Paper 2003-16, 2003.
McDonald et al., "The Co-Processing of Nickel Sulphide and Laterite Materials using Low Oxygen Pressures", Proceedings of Pressure Hydrometallurgy 2012, 42nd Annual Hydrometallurgy Meeting, Niagara Falls, Canada, Sep. 30 to Oct. 3, 2012, pp. 211-225.
McDonald et al., "The High Temperature Co-Processing of Nickel Sulfide and Nickel Laterite Sources", Minerals 2020, 10, 351.
Quinn et al. The Combined Pressure Acid Leach (CPAL) Process, Batch and Piloting Testwork, Recent Advances in Mineral Processing Plant Design, edited by Malhotra, D., Taylor, P., Spiller, E. and LeVier, M. (SME, Littleton, Colorado), pp. 140-154, 2009.

* cited by examiner

CO-PROCESSING OF COPPER SULPHIDE CONCENTRATE WITH NICKEL LATERITE ORE

FIELD OF INVENTION

The invention relates to a hydrometallurgical process for recovering copper, nickel and cobalt from a nickel laterite ore and a copper sulphide concentrate.

BACKGROUND

Sulphide ores and laterite ores are normally found in different locations and it is usual for each type of ore to be processed independently.

Pyrometallurgical refining (smelting) of copper concentrates is typically limited to high grade copper sulphide concentrates. Significant penalties are applied by smelters for low grade concentrates (<25% Cu) or for various deleterious elements (Sb, As, Bi, Pb, Hg, Se, Te, Zn, Ni, Co), due to the higher costs of processing low grade materials and/or the problems/costs associated with handling these impurity elements. As a result, pyrometallurgical refining of low grade copper concentrates, copper concentrates containing nickel or cobalt, or high concentrations of impurity elements (As, Sb, Bi, Se, Te, Hg) is limited.

While hydrometallurgical leaching to extract copper from high grade or lower grade copper sulphides is technically possible, a number of problems limit the hydrometallurgical refining of high grade copper sulphide concentrates. Further issues arise when attempting to leach and refine lower grade copper sulphide materials, sulphide materials containing nickel and cobalt, or sulphide materials containing impurities deleterious to smelting (Sb, As, Bi, Pb, Hg, Se, Te).

A first issue arises in the oxidation of sulphide sulphur from the concentrates and leaching of copper. Leaching copper sulphides, and particularly those containing chalcopyrite ($CuFeS_2$), at low (<115° C.) or medium (140 to 165° C.) temperatures can be inhibited by the formation of elemental sulphur and/or the passivation of the sulphide surface. A variety of methods are employed to deal with these issues, including adding dispersants for elemental sulphur, adding leach additives to catalyse the reactions and/or reduce the passivation (e.g., chloride, pyrite, etc.) or using multiple stages of leaching. Fine grinding of the sulphide concentrates is often required to achieve high sulphide oxidation and metals leaching at these low or medium leaching temperatures, due to the slower leaching kinetics at these temperatures.

Leaching copper sulphides at higher temperatures (>200° C.) overcomes the issue of passivation by oxidizing/destroying elemental sulphur and/or any passivated surfaces. Leaching of copper sulphides is rapid under these conditions, but most of the sulphide sulphur is oxidized to sulphate, resulting in large volumes of dilute sulphuric acid solution containing high levels of copper.

The generation of sulphuric acid is the second major problem in the hydrometallurgical refining of copper sulphide concentrates, as high sulphuric acid concentrations limit the recovery of copper from the leach solutions by solvent extraction, as the acid inhibits the loading of copper onto the extractant. This problem is exacerbated with high levels of copper in solution, since loading of copper in solvent extraction generates acid. To recover copper from these solutions, one option is to neutralize the acid with a neutralizing agent (e.g. limestone, lime, etc.), Neutralization of the acid values with a neutralizing agent significantly increases the operating costs and the volume of residue (gypsum) produced, and no additional value is gained from the acid produced from the copper sulphides.

The acid in the pressure leaching solutions can also be neutralized in a heap leach by reaction with copper oxides, secondary sulphides, or gangue minerals, which provides additional value to the acid produced during pressure leaching. However, integration of pressure leach solution with a heap leach is also problematic, as heap leaching operates with a "tight" water balance, with water only added to make up for losses of water to evaporation, and concentrated sulphuric acid added to make up for acid losses to the heap. The addition of dilute acid solution from the pressure leach makes it difficult to maintain the water balance in the heap, unless the flow of this solution is limited to very low flow rates relative to the overall heap leach flows and/or the pressure leach uses heap leach solution as its source of solution feed. Without removal of copper from the pressure leach solution prior to adding to the heap, adding pressure leach solution directly to the heap exposes the dissolved copper values to loss and/or precipitation in the heap.

Heap leach solution can contain high levels of impurities, which can be detrimental to the pressure leach or the pressure leach equipment (e.g. chlorides), if heap leach solution is added directly to the pressure leach.

Additional issues arise with the treatment of copper sulphide materials containing arsenic. Firstly, the environmental stability of the leach residues for feed materials containing arsenic may be problematic. Copper sulphide materials typically also contain iron, and the environmental stability of the solids, as measured with the Toxicity Characteristic Leaching Procedure (TCLP), can vary significantly depending on the iron:arsenic mole ratio in the feed. U.S. Pat. No. 10,544,482 to Buban et al., discloses mole ratios for Fe:As in the sulphide materials greater than 2:1, and preferably greater than 4:1 as being needed in most pressure leach processes to generate arsenic containing residues (scorodite or basic ferric arsenate sulphate) that pass the TCLP tests, and greater than 7:1 and 12:1, respectively, to generate solids that produce TCLP leachates with <1 or <0.1 mg/L As. Additional iron may be added as a sulphide mineral (e.g., pyrite/pyrrhotite) to the concentrate, but the additional cost to oxidize the sulphide sulphur to sulphate and precipitate it as gypsum limits this approach. These factors limit the amount of arsenic, and narrow the range of the grade (Fe and As) of the feed materials, that can be processed with pressure leaching. Secondly, the formation of insoluble copper arsenates during pressure leaching of copper sulphide feed materials containing arsenic may be problematic. Copper may be leached, and then a portion may be reprecipitated as a stable copper arsenate, with more precipitation of arsenic at higher concentrations of arsenic in the feed and/or lower Fe:As mole ratios in the feed. This can lead to unacceptable copper losses during leaching, depending on the arsenic content of the copper sulphide feed. For example, in U.S. Pat. No. 10,544,482, the copper extraction decreased from 98% at an Fe:As mole ratio of 10:1 down to 93% at an Fe:As mole ratio of 2.8:1.

In addition, because of the energy contained in copper sulphide containing concentrates (e.g. sulphur between 20 and 45 wt %), the solids content during high temperature pressure leaching is typically low, and is limited by the temperature of operation (i.e., typically 200 to 230° C.); quench solution must be added to the autoclave to balance the amount of heat generated and operate the autoclave autothermally.

Turning to nickel laterite processing, in high pressure acid leach (HPAL) plants for nickel laterites, the autoclaves operate at high temperatures (240 to 270° C.), but the leaching reactions are generally endothermic, meaning that the slurry feed needs to be heated. Typically, this is accomplished by preheating the slurry with multiple stages of direct steam addition. Flash steam recovered from the autoclave discharge provides a portion of the steam required, and this recovered steam is supplemented by fresh high pressure steam generated from an acid plant or power plant. The use of direct steam addition dilutes the feed slurry, which limits the concentration of nickel in the resulting leach solution, typically to between 3 and 6 g/L Ni, and decreases the solids content in the autoclave. This ultimately limits the solids feed rate through an autoclave of given size and increases the acid requirement of the feed slurry. Because direct steam addition is used for heating, the HPAL process is also heavily dependent on the solids content of the laterite slurry fed into preheating. If the solids content is low, more steam is required to heat the slurry, and this increased dilution of the slurry in the autoclave limits the solids feed rate through an autoclave of given size.

Operation of many HPAL plants for treating nickel laterites is contingent on the operation of a sulphuric acid plant, both for the supply of acid and for the supply of high pressure steam. The majority of the steam values from both the recovered flash steam and steam from the acid plant are consumed in preheating the laterite slurry to the leaching autoclaves. Frequent startup and shutdown of acid plants, which are common during the startup of nickel laterite HPAL plants, reduce the life of acid plants, requiring increased maintenance costs and/or accelerated capital replacement. The importance of the acid plant to the process also means that the economics of HPAL of nickel laterites is linked heavily to the price of sulphur and/or the acid requirement vs the nickel grade of the ore.

Copper concentrations in laterite ores are typically low (<0.1 wt %). Copper is typically lost in a mixed hydroxide laterite flowsheet (i.e., precipitated along with iron and/or aluminum and discarded) or reports to the mixed sulphide product, requiring copper removal during the refining of that material. If a refinery is able to handle the copper values in the mixed sulphide, it may not be worthwhile to produce a high value copper product, due to the low volumes of copper in the refinery feed. For example, both the Ambatovy and Corefco nickel refineries, which process mixed sulphides, produce low grade copper sulphide materials with a limited market.

Using elemental sulphur, a low cost sulphide-containing material such as pyrite or pyrrhotite concentrates, or a sulphide-containing material such as nickel sulphide minerals to generate in situ sulphuric acid to enable the leaching of a nickel laterite ore has been previously proposed. U.S. Pat. No. 3,773,891 to O'Neill and U.S. Pat. No. 3,809,549 to Opratko are early patents disclosing combining limonite ore with elemental sulphur, pyrrhotite, pyrite, furnace matte and/or ferrous sulphate, which is oxidized to generate sulphuric acid and heat for the leaching reactions with the addition of oxygen as an oxidant. The limited addition of sulphide minerals, without the addition of oxygen as an oxidant is disclosed by O'Callaghan in PCT Patent Publication No. WO 2010/0331137 A1, and by Rodriguez in AU Patent No. 2008101213 B8. A number of other proposals exist for adding sulphur, sulphide materials or nickel sulphide materials for treatment along with laterite and with the addition of oxygen as an oxidant, for example Salinovich et al, PCT Publication No. WO9607762 A1; Ferron et al., "Co-Treatment of Limonitic Laterites and Sulphur Bearing Materials as an Alternative to the HPAL Process", SGS Minerals Services—Technical Paper 2003-16, 2003; Rodriguez, AU Patent No. 2008100563 C4; Liu et al, U.S. Pat. No. 7,871,584; Quinn et al., "The Combined Pressure Acid leach (OPAL) Process, Batch and Piloting Testwork", Recent Advances in Mineral Processing Plant Design, SME, pp. 140-154; McDonald et al., "The Co-Processing of Nickel Sulphide and Laterite Materials using Low Oxygen Pressures", Proceedings of Pressure Hydrometallurgy 2012, 42$^{nd}$ Annual Hydrometallurgy Meeting, Niagara Falls, Canada, Sep. 30 to Oct. 3, 2012, pp. 211-225: and McDonald et al, "The High Temperature Co-Processing of Nickel Sulfide and Nickel Laterite Sources", Minerals 2020, 10, 351.

In spite of these reports, the industry generally continues to favour the addition of sulphuric acid generated from a sulphuric acid plant for the HPAL leaching of nickel laterite ores. To the knowledge of the applicant, the hydrometallurgical co-processing of nickel laterites with a sulphidic material has not yet been commercialized.

SUMMARY OF THE INVENTION

A process is provided to treat both a sulphide concentrate containing copper and one or more of arsenic, antimony or bismuth, and a nickel laterite ore in a single pressure leaching step to recover copper from both feed sources as copper cathode and nickel and cobalt from both sources as a salable precipitate (e.g. mixed hydroxide or mixed sulphide).

Broadly stated, the disclosure provides a hydrometallurgical process for the recovery of nickel, cobalt and copper. The process includes:

a) co-processing in a pressure vessel, a feed of a copper-containing sulphide concentrate containing one or more of arsenic, antimony, and bismuth, and a feed of a laterite ore containing nickel and cobalt in a pressure oxidative leaching step under conditions including mixing, and an introduction of oxygen, wherein the feed of the copper-containing sulphide concentrate and the introduced oxygen are controlled to produce sulphuric acid to leach nickel, cobalt, copper and acid soluble impurities into a liquid phase of an acidic leach slurry, to precipitate iron compounds and a majority of the arsenic, antimony and bismuth as solids, and to produce heat to heat the incoming feeds to a temperature in the pressure vessel above 230° C.;

b) withdrawing from the pressure vessel, a reacted slurry comprising the liquid phase and the solids;

c) separating the solids from the liquid phase to produce a pregnant leach solution (PLS) containing the nickel, cobalt, copper and the acid soluble impurities;

d) conducting a first solution purification stage on the PLS to neutralize at least a portion of free acid and to precipitate one or more impurities selected from iron, aluminum, chromium and silicon, followed by separating as solids, the precipitated impurities and other solids from a first purified solution e) separating copper from first purified solution with a solvent extraction step to produce a raffinate solution reduced in copper and a copper loaded organic phase;

f) stripping the copper loaded organic phase with an acidic solution to produce a copper loaded solution;

g) recovering copper from the copper loaded solution with electrowinning h) conducting a second solution purification stage on the raffinate from e) by one or both of neutralizing at least a portion of free acid and precipitating one or more impurities selected from iron, aluminum, chromium and silicon, followed by separating as solids, the precipitated impurities and other solids from a second purified solution; and i) recovering nickel and cobalt as mixed hydroxides or as mixed sulphides from the second purified solution.

As used herein and in the claims, the terms and phrases set out below have the following definitions.

"Free acid" refers to a concentration of $H_2SO_4$ in solution, such as measured at the discharge from the autoclave or in subsequent process steps. The standard used to measure free acid is conducted at room temperature (20° C.) by titrating of an aliquot of acidic solution with sodium carbonate solution to pH 3.5. Before performing this titration, potassium iodide is added to the solution to react with ferric iron ($Fe^{3+}$), which may hydrolyze and interfere with the $H_2SO_4$ titration, and sodium thiosulphate solution is added to react with any iodine ($I_2$) that is formed. The reactions involved in this determination are provided below:

$$2Fe^{3+} + 2I^- = 2Fe^{2+} + I_2$$

$$I_2 + 2S_2O_3^{2-} = 2I^- + S_4O_6^{2-}$$

$$H_2SO_4 + Na_2CO_3 = Na_2SO_4 + H_2O + CO_2.$$

"Stability" or "stable" as used herein with reference to arsenic residue stability or the stability of solid iron arsenic compounds formed in pressure oxidative leaching, refers to maintaining the environmental stability of the arsenic solids that have been formed in the pressure oxidative leaching step and in the process steps subsequent to pressure oxidative leaching, and refers to the environmental stability as measured by the standard Toxicity Characteristic Leaching Procedure (TCLP). TCLP is a testing methodology for waste materials, with protocols set by the Environmental Protection Agency (EPA) in the United States, and other countries, see Environmental Protection Agency Publication SW-846, "Test Methods for Evaluating Solid Waste, Physical/Chemical Methods", Method 1311, "Toxicity Characteristic Leaching Procedure@, Revision 6, February 2007. The current limit for arsenic in the TCLP leachate in the United States is 5 mg/L, (see Code of Federal Regulations, Title 40, Vol. 27, Section 261.24, Jul. 1, 2012). Solid iron arsenic compounds that are more stable than the regulatory limit (i.e., the arsenic concentration in TCLP leachate is less than 5 mg/L) can be formed in the pressure oxidative leaching step. Thus, "stable solids" as used herein refers to the stability of these solids, as measured by TCLP, from after pressure oxidation until after the solids are separated from the acidic leach solution, and after any subsequent cyanidation step.

"Quench solution" refers to solution that is added to a pressure vessel as a method of direct cooling.

"Limonite" ore refers to a laterite ore that is primarily a mixture of metal oxides and hydroxides (>40% Fe, Ni <2%; <3 wt % MgO).

"Transition ore" refers to a laterite ore that is a mixture of oxide/hydroxide and silicate minerals (<3 wt % Ni, 15 to 40 wt % Fe, 3 to 20 wt % MgO).

"Oxidizing ore" refers to a laterite ore that contains more oxidant than reductant, which results in the oxidation of Cr(III) to Cr(VI) in solution during acid leaching, without the addition of oxidants or reductants other than those present in the ore.

"Reducing ore" refers to a laterite ore that contains more reductant than oxidant, which results in the reduction of Fe(III) to Fe(II) in solution during acid leaching, without the addition of oxidants or reductants other than those present in the ore.

"Mixed sulphide" refers to a sulphide precipitate containing both nickel and cobalt.

"Mixed hydroxide" refers to a hydroxide precipitate containing both nickel and cobalt.

"Excess acid" refers to sulphuric acid that is generated during the pressure oxidative leaching of a laterite ore and a sulphide concentrate, in excess of the stoichiometric requirement to leach the acid-soluble metals, to dissolve aluminum and precipitate a portion of the aluminum as alunite, and to form magnesium bisulphates (e.g., $Mg_5(SO_4)_2(HSO_4)_6$) from soluble magnesium at the operating temperature of the autoclave (230 to 270° C.).

"Majority" refers to a percentage greater than 50%.

DETAILED DESCRIPTION OF THE INVENTION

Several exemplary embodiments for the hydrometallurgical process of this disclosure are provided in FIGS. 1-6. Other embodiments, including embodiments with atmospheric leach steps to consume acid in the pressure leach discharge slurry or in the primary copper extraction raffinate, or to precipitate zinc as a hydroxide or sulphide material, are not specifically illustrated in the figures, but are described as embodiments in the description below.

Figure 1:
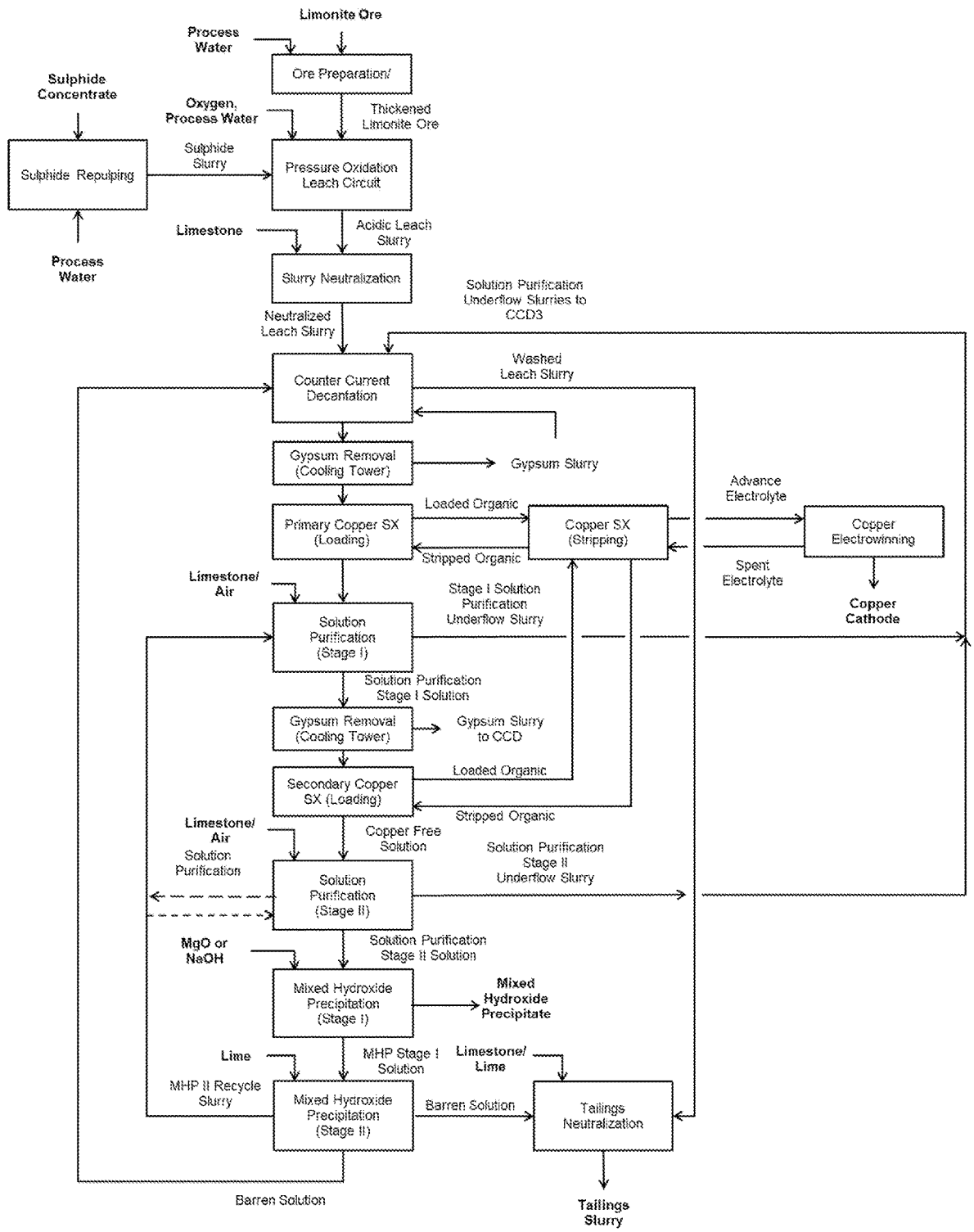
FIG. 1 is a flow diagram for one embodiment of the co-processing process with a slurry neutralization step after the pressure oxidative leach, two steps of solution purification, recovery of the copper values in two steps of solvent extraction followed by stripping and electrowinning, and mixed hydroxide precipitation of the nickel and cobalt metals.
Figure 2:
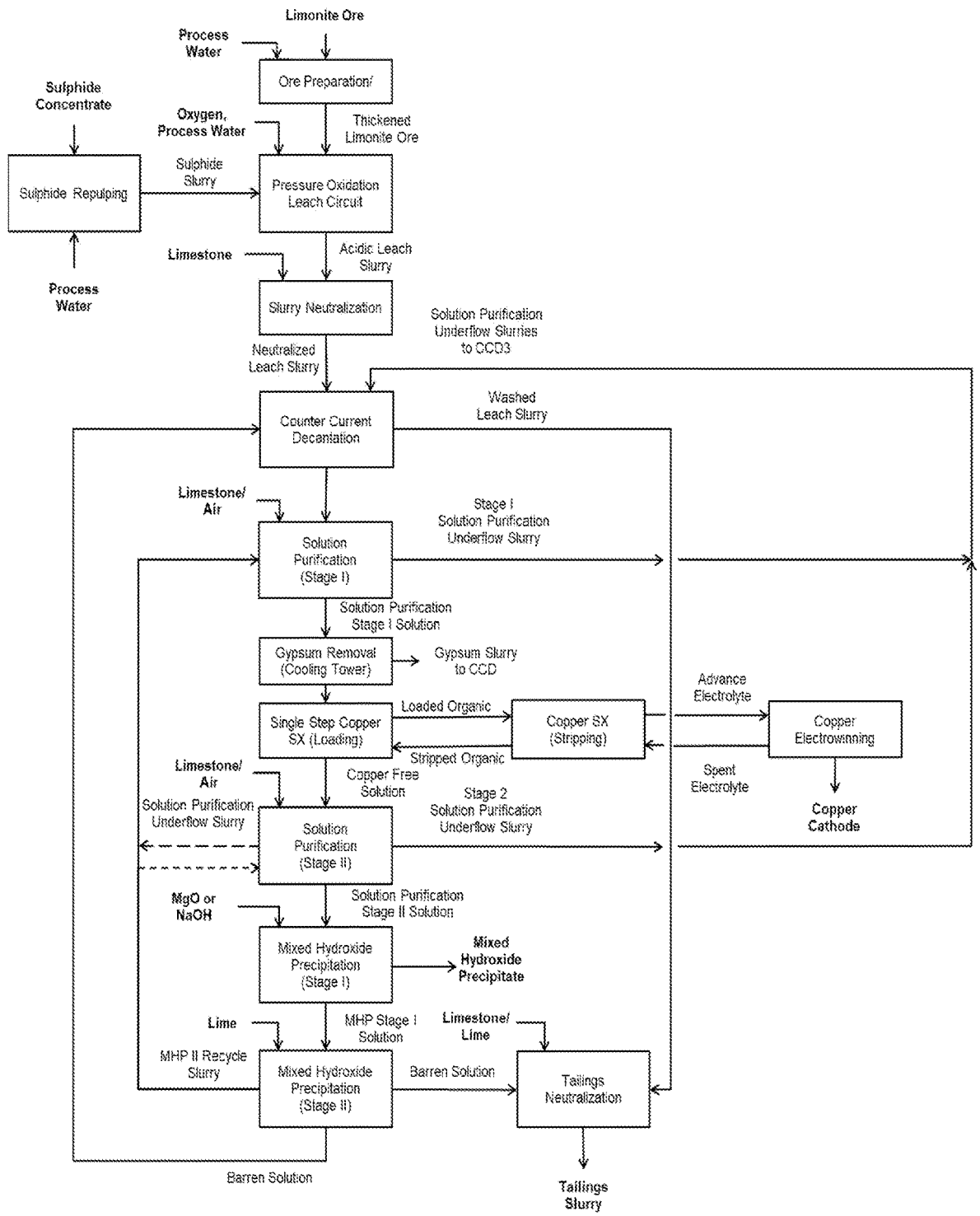
FIG. 2 is a flow diagram of one embodiment similar to FIG. 1, with mixed hydroxide precipitation of the nickel and cobalt metals, but with a single step of solvent extraction for low copper concentrations (<18 g/L Cu) after a first solution purification step.
Figure 3:
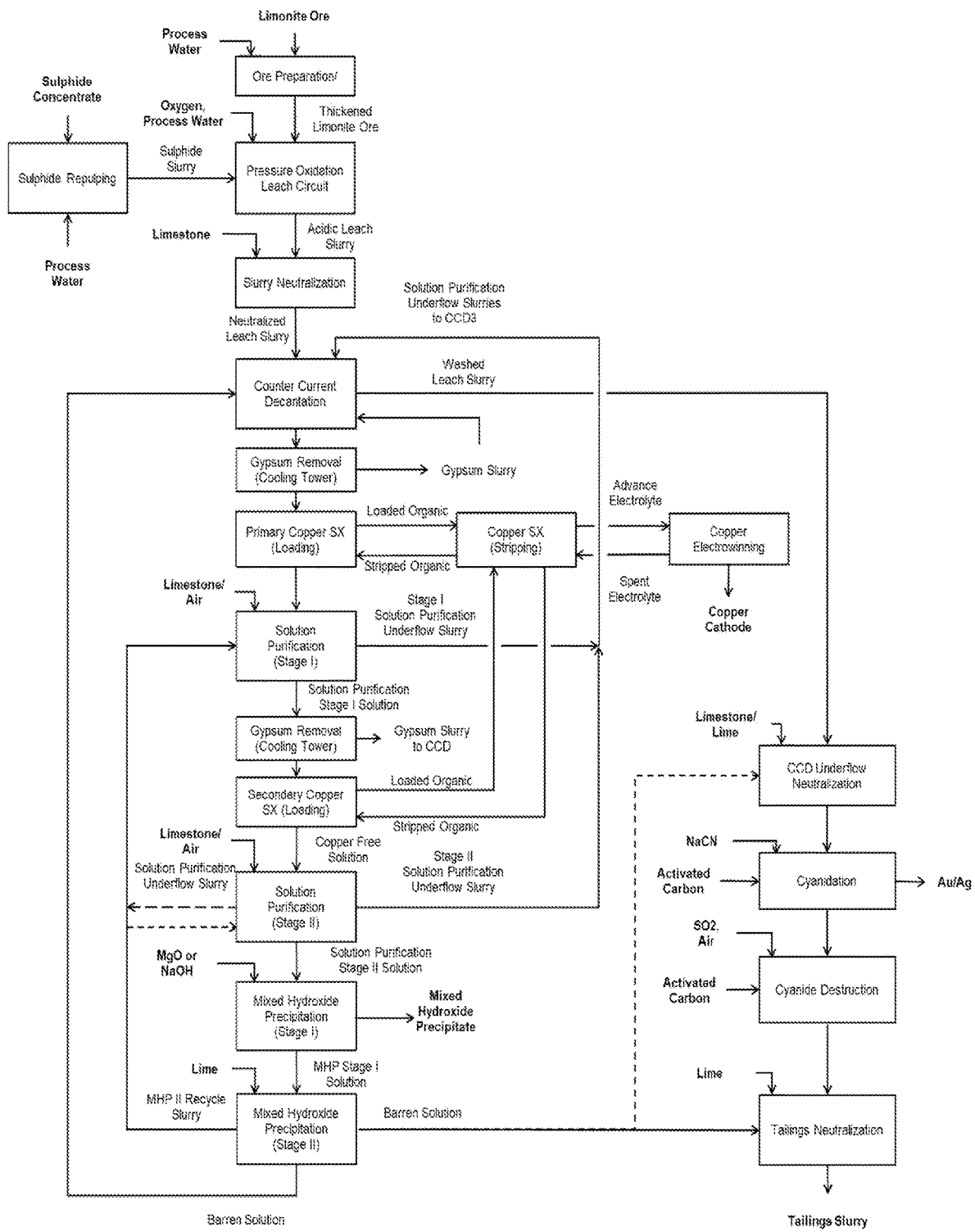
FIG. 3 is a flow diagram of one embodiment of the process similar to FIG. 1, with mixed hydroxide precipitation of the nickel and cobalt metals, two steps of solvent extraction to recover copper, and gold/silver recovery on the leach slurry from the liquid solid separation step.

FIGS. 1 to 3 show embodiments in which nickel and cobalt are recovered as mixed hydroxide precipitates. FIG. 1 shows the process with two steps of copper solvent extraction, while FIG. 2 shows the process with a single step of copper solvent extraction, which may be used for situations with low copper concentrations, for example, less than 18 g/L Cu. FIG. 3 shows an embodiment from FIG. 1 similar to FIG. 1, but with the inclusion of a series of steps for the recovery of gold and silver by cyanidation from the washed leach slurry from the counter current decantation step.

Figure 4:
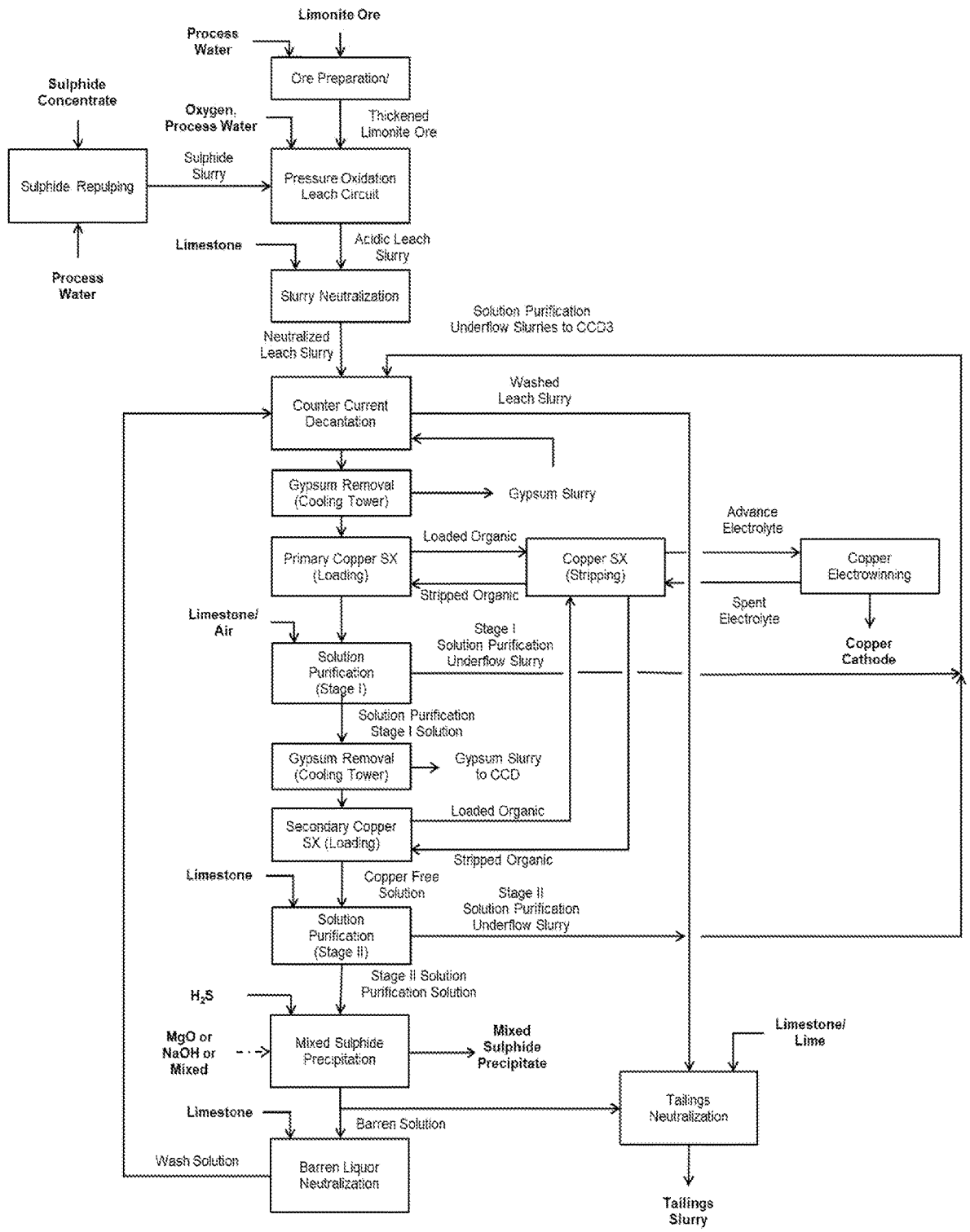
FIG. 4 is a flow diagram of one embodiment of the process similar to FIG. 1, but with mixed sulphide precipitation of the nickel and cobalt metals and two steps of solvent extraction for the copper recovery.
Figure 5:
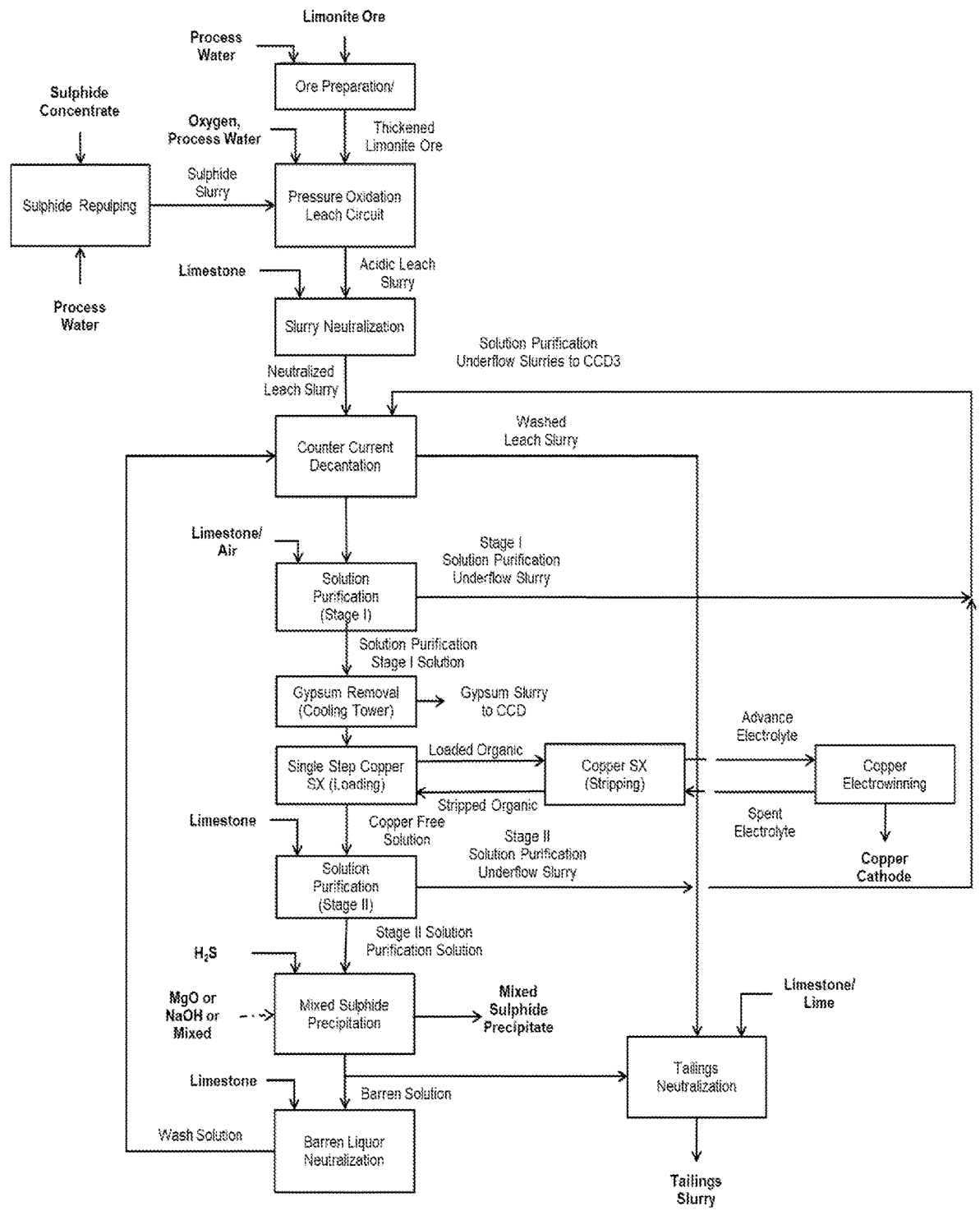
FIG. 5 is a flow diagram of one embodiment of the process similar to FIG. 1, but with mixed sulphide precipitation of the nickel and cobalt metals and a single step of solvent extraction for low copper concentrations.
Figure 6:
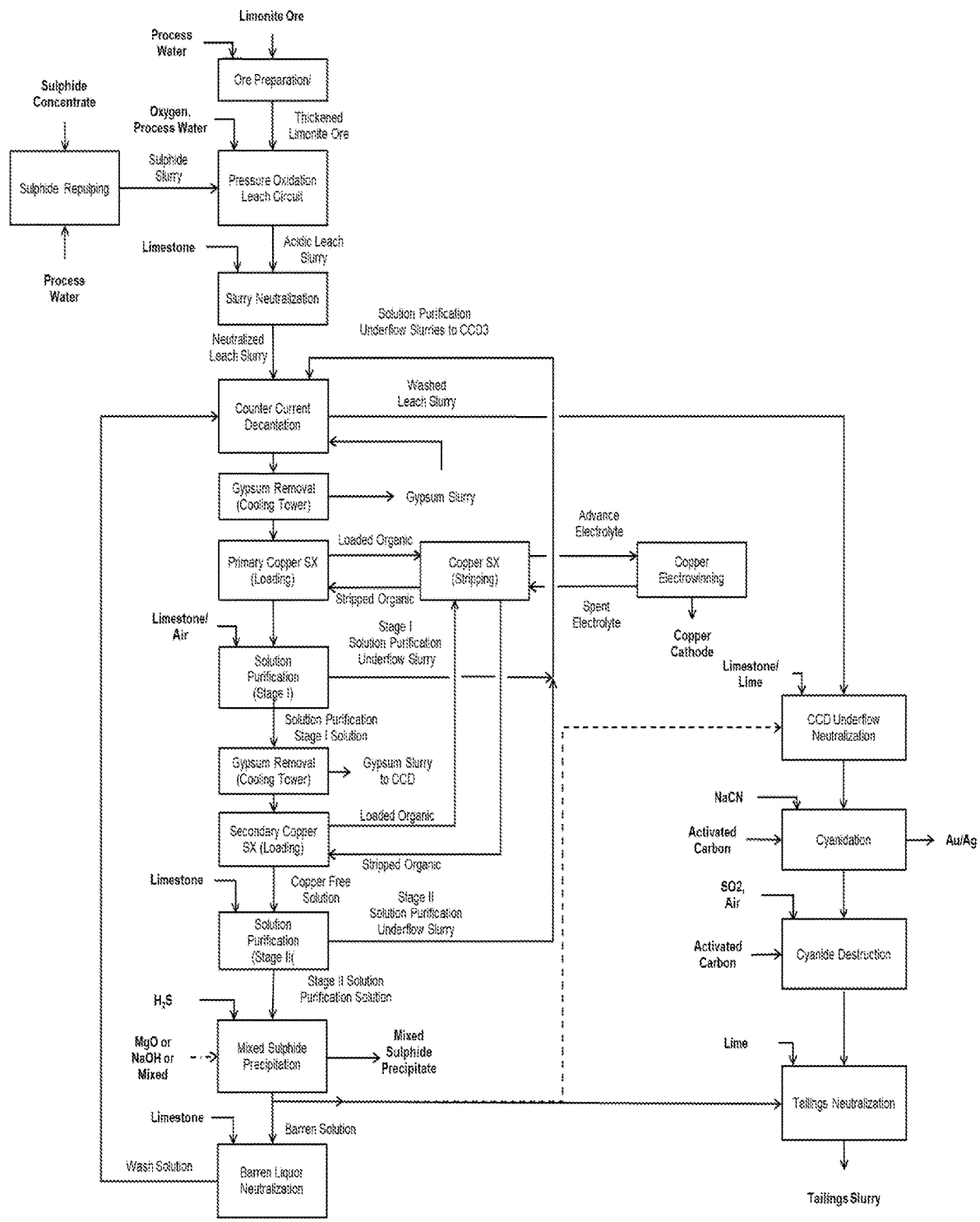
FIG. 6 is a flow diagram of one embodiment of the process similar to FIG. 1, but with mixed sulphide precipitation of the nickel and cobalt metals, two steps of solvent extraction for copper recovery, and gold/silver recovery on the leach slurry from the liquid solid separation step.

FIGS. 4 to 6 show embodiments of the process in which nickel and cobalt are recovered as mixed sulphide precipitates. FIG. 4 shows the process with two steps of copper solvent extraction. FIG. 5 shows the process with a single step of copper solvent extraction, which may be used for situations with low copper concentrations, for example, less than 18 g/L Cu. FIG. 6 shows the embodiment from FIG. 4, but with the inclusion of a series of steps for the recovery of gold and silver by cyanidation from the washed leach slurry from the counter current decantation step.

Feeds to the Process

The copper-containing sulphide concentrate feed to the process may also contain one or more of the following materials:
 i. Copper sulphide concentrates, including those containing high levels of impurities, such as As (>0.5 wt %), Sb (>0.1 wt %), Bi (>0.05 wt %), Pb (>1 wt %), Hg (>0.0005%), Ni and Co (>0.5 wt %), Se (>0.03 wt %), or Te (>0.03 wt %);
 ii. Pyrite or pyrrhotite concentrates, or nickel or cobalt sulphide concentrates, including those containing impurities such as As, Sb, Bi, Cu, Pb, Hg, Se, or Te;
 iii. Bulk sulphide concentrates, which may contain copper, cobalt and/or nickel in sulphide minerals, pyrite and/or pyrrhotite; and
 iv. Sulphide-containing ores or concentrates, which may contain copper, cobalt and/or nickel sulphide minerals, with greater than 15 wt % sulphide sulphur.

The copper-containing sulphide concentrate feed may be prepared as a slurry, by repulping filtered concentrate to a target solids content, or is provided as a thickened slurry to the autoclave. The solids content of the sulphide concentrate slurry fed into this process generally contains a minimum of 50 wt % solids, but preferably >60 wt % or >65 wt % solids.

If multiple types of sulphide material are used in the feed, each of the individual sulphide material slurries may be added separately to the autoclave or the sulphide materials may be blended to produce a single combined sulphide concentrate feed slurry. In general, a minimum sulphide sulphur concentration of the total sulphide concentrate feed is 15 wt %, and preferably is greater than 20 wt % or greater than 25 wt %. Materials with lower sulphide content may be added along with materials with higher sulphide sulphur content to reach these levels of sulphide concentration in the total sulphide concentrate feed.

The feed of the laterite ore containing nickel and cobalt may contain one or more of the following materials:
 i. Limonite ore (>40% Fe, Ni <2%; <3 wt % MgO);
 ii. Transition ores (<3 wt % Ni, 15 to 40 wt % Fe, 3 to 20 wt % MgO); and
 iii. Asbolane/Asbolite containing ores (Co >0.2 wt %, Mn >1 wt %).

In laterite ores, nickel is primarily present either in solid solution with goethite (FeOOH) or in association with magnesium silicates. Cobalt is primarily present in association with asbolane/asbolite ((Mn,Co)$O_2 \cdot n$ $H_2O$), but is also present in solid solution along with nickel in goethite (FeOOH).

The asbolane/asbolite acts as an oxidizing agent when laterite ores are leached in acid at high temperatures. Laterite ores also typically contain some amount of organic carbon, which acts as a reducing agent when laterite ores are leached in acid at high temperatures. Depending on the relative amounts of oxidizing and reducing agents present in the ore, laterite ores fall into one of the following two categories when leached in acid at high temperatures, without the addition of oxidants or reductants other than those present in the ore:
 i. Oxidizing ores: More oxidant than reductant, resulting in the oxidation of Cr(III) to Cr(VI) in solution; or
 ii. Reducing ores: More reductant than oxidant, resulting in the reduction of Fe(III) to Fe(II) in solution.

The laterite ore may be beneficiated or processed by one or more of screening, cycloning, and rotary scrubbing before being sent to a thickener to provide a thickened slurry to the autoclave. The solids content of the laterite ore thickener underflow slurry is greater than 30 wt %, and is preferably greater than 35 or 40 wt %.

The sulphide concentrate added to the autoclave is adjusted to provide enough acid for the leaching reactions; that is, enough sulphide concentrate is added to generate sufficient acid to leach the soluble metals from the concentrate and from the laterite ore, to dissolve aluminum and precipitate a portion of the aluminum as alunite and to form magnesium bisulphates (e.g., ($Mg_5(SO_4)_2(HSO_4)_6$)) at the operating temperature of the autoclave. In addition to the acid for these reactions, excess acid of at least 20 to 25 g/L $H_2SO_4$ at temperature is generally preferred to give the optimum nickel, cobalt and copper extractions. For solutions containing 1 to 10 g/L Mg, for example, this is equivalent to about 22 to 49 g/L $H_2SO_4$, as measured, in samples of the autoclave discharge solution at room temperature.

As the acid requirement of the laterite ore changes, these adjustments can be made to provide enough acid for the leaching reactions either by varying the mass ratio of sulphide concentrate to the laterite ore or by varying the amount of high sulphur material, such as pyrite or pyrrhotite concentrates or elemental sulphur, that is added to the concentrate feed slurry.

Quench solution may be added, as required, to maintain the autoclave temperature. This solution can be one or more of:
 i. Process water;
 ii. Recycled solutions from downstream processing containing copper, nickel and/or cobalt; and
 iii. Recycled solutions from downstream processing after removal of copper, nickel and/or cobalt.

Pressure Leaching of Combined Feeds—Co-Processing

Pressure leaching may be performed in a multi-compartment horizontal autoclave or in a series of individual pressure vessels. Agitation is provided for solids suspension and/or dispersion of oxygen using mechanical agitation in each compartment and/or pressure vessel.

Sulphide concentrate slurry and laterite ore slurry are added to the first compartment of the autoclave or first vessel in a series of pressure vessels. In some embodiments, one or both of these feeds may be heated (directly or indirectly) before adding them to the autoclave. In other embodiments, the feeds are added directly to the autoclave, without any form of preheating. The operating temperature is maintained between 230 and 270° C., and preferably between 245 and 260° C.

Oxygen is added to the autoclave through oxygen spargers to oxidize the sulphide minerals, ferrous iron, and other reducing components of the sulphide concentrate and laterite ore. Oxygen addition is added in all compartments or vessels where the oxidation of the sulphide minerals takes place; once this reaction is complete, oxygen addition may not be required in later compartments or vessels in series. Oxygen addition is controlled by the oxygen flow rate and by maintaining an oxygen partial pressure in the autoclave. The oxygen partial pressure is controlled between 200 and 1000 kPa and preferably between 300 and 700 kPa.

The relative amount of each feed added is dependent on the heat balance in the autoclave, the sulphide sulphur content of the sulphide concentrate, and acid requirements of the sulphide concentrate and laterite ore. In some embodiments, sulphide concentrate is provided to the autoclave to supply enough heat (i.e., by the oxidation of the sulphide minerals) to heat the incoming feed, to maintain the autoclave temperature, and to generate enough sulphuric acid to leach the sulphide concentrate and laterite ore. The reactions in pressure leaching are listed below. In general, the sulphuric acid generated by sulphide oxidation leaches nickel, cobalt, copper and acid soluble impurities into a liquid phase of an acid leach slurry, with a majority of the aluminum, iron, arsenic, antimony and bismuth precipitated as solids.

Examples of Sulphide Oxidation Reactions $$CuFeS_2 + 4O_2 = CuSO_4 + FeSO_4$$

$$Cu_5FeS_4 + 2H_2SO_4 + 8O_2 = 5CuSO_4 + FeSO_4$$

$$Cu_3AsS_4 + 2.5H_2O + O_2 = 3CuSO_4 + H_2SO_4 + H_3AsO_4$$

$$CuS + 2O_2 = CuSO_4$$

$$Cu_2S + H_2SO_4 + 2.5O_2 = 2CuSO_4 + H_2O$$

$$Sb_2S_3 + 7O_2 + 6H_2O = 2H_3SbO_4 + 3H_2SO_4$$

$$FeS_2 + 3.5O_2 + H_2O = FeSO_4 + H_2SO_4$$

$$FeS + 2O_2 = FeSO_4$$

$$FeAsS + 3.75O_2 + 1.5H_2O = FeSO_4 + H_3AsO_4$$

$$(Fe,Ni)_9S_8 + H_2SO_4 + 15.5O_2 = 9(Fe,Ni)SO_4 + H_2O$$

$$(Co,Cu)Co_2S_4 + 7.5O_2 + H_2O = 2CoSO_4 + (Co,Cu)SO_4 + H_2SO_4$$

Ferrous Oxidation Reactions $$2FeSO_4 + H_2SO_4 2O_2 = Fe_2(SO_4)_3 + H_O$$

$$MnO_2 + 2FeSO_4 + 2H_2SO_4 = MnSO_4 + Fe_2(SO_4)_3 + 2H_2O$$

Laterite Leaching Reactions $$NiO + H_2SO_4 = NiSO_4 + H_2O$$

$$CoO + H_2SO_4 = CoSO_4 + H_2O$$

$$CuO + H_2SO_4 = CuSO_4 + H_2O$$

$$ZnO + H_2SO_4 = ZnSO_4 + H_2O$$

$$MgO + H_2SO_4 = MgSO_4 + H_2O$$

$$Cr_2O_3 + 3H_2SO_4 = Cr_2(SO_4)_3 + 3H_2O$$

$$2AlOOH + 3H_2SO_4 = Al_2(SO_4)_3 + 4H_2O$$

$$2FeOOH + 3H_2SO_4 = Fe_2(SO_4)_3 + 4H_2O$$

Iron Precipitation Reactions $$Fe_2(SO_4)_3 + 3H_2O = Fe_2O_3 + 3H_2SO_4$$

$$2H_3AsO_4 + Fe_2(SO_4)_3 + 2H_2O = 2FeAsO_4 \cdot 2H_2O + 3H_2SO_4$$

$$2\,H_3SbO_4 + Fe_2(SO_4)_3 = 2FeSbO_4 + 3H_2SO_4$$

Oxidation and leaching of the sulphide minerals is typically very fast (<15 min) at the high operating temperatures. The leaching of cobalt and manganese from asbolane/asbolite is also rapid (<15 min) as the asbolane/asbolite serves as an oxidant to assist in the leaching of the sulphide minerals, instead of reacting with dissolved Cr(III) to produce Cr(VI) in solution. Leaching nickel from goethite and/or silicates is slower and, thus, these reactions typically determine the overall retention time for the process.

When leaching sulphide feeds containing arsenic and/or antimony, a surprising result of the process is that the presence of arsenic and/or antimony in the sulphide concentrate can significantly reduce or limit the rate and extent of nickel extraction from the laterite ore when they are processed together. Leaching the laterite ore to a lesser extent may also produce solids with poor settling properties, making separation of the leach liquor from the solids difficult, due to lower underflow solids densities that can be achieved during thickening of these solids. Nickel extractions of over 92% from the laterite ore, and preferably over 95%, are generally preferred to avoid these problems with settling behaviour.

With the rapid leaching of the sulphide minerals, arsenic and/or antimony in those concentrates are also leached, oxidized to As(V) and Sb(V), and then precipitated as a ferric arsenate and/or ferric antimonate phases. Without applying controls to the feeds, it has been shown herein that these stable ferric arsenate and/or antimonate phases can inhibit leaching of nickel from the goethite or silicate minerals. Ferric arsenate and/or antimonate phases are highly stable in acidic conditions and, without being bound by the same, it is believed that they may form a coating on the surface of the goethite/silicate particles that inhibits the acid in solution from leaching the goethite/silicate particles. This is evidenced by a drop in the kinetics and extent of nickel extraction, and reduced leaching of aluminum and precipitation of the aluminum as alunite, which can be detected by a drop in the sulphate sulphur concentration in the leach residues.

In this process, a first factor discovered to influence the rate and extent of nickel extraction from the laterite ore is the Fe:As mole ratio and/or the Fe:Sb mole ratio in the sulphide concentrate. While the laterite ore(s) typically contains very high iron concentrations, because the sulphide minerals leach rapidly, relative to the iron containing goethite/silicate minerals in the laterite ore, it is primarily the iron in the concentrate that is available to react with and precipitate the arsenic and/or antimony. With more iron available from the concentrate relative to arsenic or antimony when arsenic and antimony from the sulphide concentrate are being leached and precipitated, this effect on nickel extraction is reduced. Increasing the arsenic or antimony content, without adjusting the iron concentration in the sulphide feed, can cause the nickel extraction to drop off to unacceptable levels (e.g., <95%), where settling behaviour of the leach residue can also be impacted.

A second factor that affects the impact of arsenic and/or antimony on nickel leaching from the laterite is the autoclave retention time. Without arsenic or antimony in the sulphide concentrate, retention times as low as 45 minutes can be used to reach nickel extractions of over 95%. However, with arsenic and/or antimony present in the sulphide concentrate, longer retention times may be required to reach 95% nickel extraction. Alternatively, or in addition, the Fe:As mole ratio and/or Fe:Sb mole ratio in the sulphide concentrate may be limited to ensure nickel extractions remain above 95%. In the presence of arsenic and/or antimony, retention times are generally greater than 60 minutes in continuous operation, and preferably greater than 90 min or greater than 120 min.

Operating above a lower limit of the Fe:As and/or Fe:Sb mole ratios in the sulphide concentrate is discovered to be effective in order to achieve nickel extractions of over 95% for all laterite ores tested. However, oxidizing ores are discovered to be more sensitive to this factor, with the decrease in nickel extraction occurring at higher Fe:As ratios than that for reducing ores. For concentrates containing arsenic, maintaining the Fe:As mole ratio greater than 4:1, and preferably greater than 7:1, or greater than 10:1, depending on the laterite ore type and retention time used, ensures that nickel extractions of over 95% are reached. For concentrates containing antimony, maintaining the Fe:Sb ratio greater than 8:1, and preferably greater than 15:1 or greater than 21:1, depending on the retention time used, ensures that nickel extractions of over 95% are reached.

The environmental stability of arsenic in the leach residues, based on TCLP testing, is not found to be affected by the amount of arsenic in the feed or the extent of nickel leaching. The high Fe:As mole ratio in the overall feed, due to the iron content of the laterite and addition of laterite solids relative to concentrate solids, leads to highly stable solids, regardless of the Fe:As mole ratio in the sulphide concentrate.

Autoclave Letdown

Reacted slurry is discharged from the autoclave into a letdown system to reduce the temperature of the slurry, for example to less than 100° C., and to reduce the pressure, for example to atmospheric pressure. This is conventionally done in a series of flash tanks, in which a control valve or fixed choke is used to control the flow of slurry to the flash tanks, and the slurry is flashed, generating flash steam. This is normally done in multiple stages to reduce the energy released in each stage and to lower slurry velocities into the flash tank. The flash steam may be recovered and used as a heating/steam credit. Removing water from the solution by flashing increases the concentration of metals in solution.

Slurry Neutralization/Atmospheric Leaching

As noted above, for solutions with 1 to 10 g/L Mg, the liquid phase of the pressure leach generally includes free acid in an amount of at least 22 to 49 g/L $H_2SO_4$. Optionally, the process includes a slurry neutralization step before liquid solid separation, to partially neutralize free acid in the liquid phase. Lower free acid concentration entering liquid solid separation reduces corrosion and/or material costs in liquid solid separation. Copper recovery from solutions with solvent extraction is limited by both the copper and acid concentrations in the feed solution to solvent extraction and, thus, lowering the free acid concentration in this step improves copper recovery for embodiments where copper is recovered by solvent extraction of the CCD overflow solution.

The slurry neutralizing step can be done in one of the following ways. In some embodiments, a neutralizing agent is added, such as limestone, to neutralize a portion of the free acid in solution. In addition, or separately, an acid consuming ore or oxide material is added (e.g., transition laterite ore, manganese sea nodules, asbolane/asbolite containing materials), along with oxidants or reductants as required by the material, to partially neutralize free acid and/or leach additional metals values into solution.

When adjusting the pH of sulphate solutions containing nickel and cobalt, nickel and cobalt are prone to co-precipitation, particularly in the presence of, or during the precipitation of, iron compounds, resulting in nickel and cobalt losses to the solids. To prevent the co-precipitation of nickel and cobalt, along with the iron solids in the pressure leach slurry, the free acid concentration is preferably reduced to between 2 and 10 g/L using one or both of these methods in the slurry neutralization step.

For concentrate feeds containing arsenic, a portion of the iron and arsenic also precipitates when the free acid concentration is decreased. The resulting solids are environmentally stable (i.e., <5 mg/L As in leachate from Toxicity Characteristic Leaching Procedure (TCLP) testing).

Liquid Solid Separation (Counter Current Decantation Wash)

The solids are separated from the liquid phase, to produce a pregnant leach solution (PLS) containing the nickel, cobalt and copper with the acid soluble impurities. The liquid solid separation is preferably in a series of thickeners operating in a counter current decantation wash configuration. This allows for washing of the metals values from the solids, while minimizing dilution of the metals with the wash solution. For example, between 4 and 8 thickeners in series may be used, depending on the liquid solid separation and washing properties of the leached solids.

Copper Solvent Extraction—Solvent Extraction Step(s)

Copper is recovered from a feed solution using solvent extraction (SX). Examples of organic copper solvent extraction reagents include Acorga® reagents produced by Solvay S.A. or LIX® reagents produced by BASF. These are typically made up of ketoximes, aldoximes or mixtures of the ketoximes and aldoximes. These reagents are combined with a diluent and then contacted with the feed solution in liquid-liquid mixers and settlers to allow the organic and aqueous phases to separate. Copper solvent extraction is widely used to recover copper selectively from impure solutions.

Copper recovery from feed solutions with solvent extraction is limited by both the copper and free acid concentrations in the feed solution to solvent extraction. For a specific solvent extraction configuration, copper recovery may be reduced to below acceptable levels (e.g., typically >95% and preferably >99%) if the copper the copper and free acid concentrations are too high for effective loading of copper onto the extractant.

Depending on the copper concentration and free acid concentration, copper is generally recovered in the following configurations of solvent extraction:

i. A single step solvent extraction on a first purification solution, i.e., the overflow solution from a first solution purification stage described below, if copper concentrations in the CCD overflow are sufficiently low (<18 g/L Cu, and preferably <10 g/L Cu); or ii. Two steps of solvent extraction, that is on the PLS from the liquid solid separation step, i.e., the overflow solution from the CCD (herein termed primary SX step) and on a first purification solution, i.e., on the overflow solution from a first solution purification stage described below (herein termed secondary SX step).

Neutralization of the solution to pH 3.5 to 3.8 in the solution purification step preceding solvent extraction allows copper to be removed to low levels in the secondary SX stage or in single step solvent extraction.

Each step of the solvent extraction may contain one or more extraction stages (i.e., one stage=one mixer-settler pair) in one or more trains (i.e., series of mixer settlers) depending on the concentration of copper and free acid in the solutions and the flow rates of organic and aqueous required. Solvent extraction typically operates at between 20 and 40° C., in this case, preferably at 40° C. In most embodiments, the feed solution to the solvent extraction steps is cooled. Cooling the solution provides an additional benefit ahead of solvent extraction. After leaching and partial neutralization, the solution may be saturated in calcium sulphate. This may be due to the calcium content of the autoclave feed(s) or due to the addition of calcium based neutralizing agents (e.g., limestone). The solution may also contain elevated levels of amorphous or colloidal silica. Both calcium and silica can lead to crud formation (e.g. gypsum precipitation), problems with phase disengagement (e.g., amorphous silica) or other problems in solvent extraction. Cooling the solution can be used to precipitate and remove these impurities before solvent extraction.

Cooling can be accomplished in a number of ways. In some embodiments a cooling tower is used to cool the solution (e.g., to 20 or 30° C.) and gypsum and/or amorphous/colloidal silica may be precipitated in a single unit operation, as shown in the FIGS. 1 to 6. The solution is then reheated (e.g., to 30 to 40° C.) with an indirect heat exchanger either with flash steam or with the incoming CCD solution (for primary SX in two step SX) or with the first stage solution purification overflow as described below (for single step SX or secondary SX in two step SX).

Hydrogen ions are transferred to solution as copper is loaded onto the organic extractant. The copper solvent extraction step produces a raffinate solution reduced in copper and a copper loaded organic phase. The raffinate is sent to a first stage solution purification as described below (i.e., primary solvent extraction raffinate in two step SX) or to a second stage solution purification as described below (i.e., single step solvent extraction raffinate or secondary solvent extraction raffinate in two step SX).

Copper Solvent Extraction—Stripping Step(s)

Copper is stripped from the loaded organic phase with an acidic solution, for example with spent electrolyte from copper electrowinning, to produce a copper loaded solution. The loaded organic phase may be stripped in a single step from one or more extraction steps by combining the loaded organic as a single stream, or the loaded organic from separate extraction steps can be stripped separately. One or more stages (i.e., one stage=one mixer-settler pair) in one or more trains (i.e., series of mixer settlers) may be used for stripping the organic phase depending on the concentration of copper and free acid in the solutions and the flow rates of organic and aqueous required. The stripped organic is returned to the extraction stages for loading and the stripped solution becomes the pregnant electrolyte that feeds the copper electrowinning circuit.

Copper Electrowinning

Copper is recovered from the copper loaded solution as copper cathode by electrowinning (EW), using conventional electrowinning practice. The spent electrolyte is returned to the solvent extraction stripping step.

Atmospheric Leaching with Raffinate from Primary SX

In configurations in which two solvent extraction steps are used, the raffinate from the primary solvent extraction step is high in free acid due to the loading of copper onto the organic in the SX stages. Optionally, a portion of the free acid in the primary SX raffinate solution can be neutralized in an atmospheric leach step. This step has the benefit of leaching additional metal values into solution before the solution purification steps of the process, while reducing the amount of limestone required in the purification steps. Potential feeds to this atmospheric leach step include the following:

i. Acid consuming ore or oxide material (e.g., transition laterite ore, manganese sea nodules, asbolane/asbolite containing materials) containing Cu, Co and/or Ni;

ii. Impure mixed carbonate and/or hydroxide materials, containing Cu, Co and/or Ni; and iii. Sulphide concentrates containing carbonate minerals.

Reacting carbonate contained in sulphide concentrates before introducing them to the autoclave as part of the concentrate feed slurry has the added benefit of removing $CO_2$ forming minerals from the sulphides. The formation of $CO_2$ in the leaching autoclave requires more frequent venting of the autoclave, increasing heat loss and reducing the utilization of oxygen.

This step is generally operated between 50 and 90° C. and preferably 80 to 90° C. in atmospheric tanks. The free acid concentration in solution is preferably reduced to between 2 and 10 g/L in this step.

For the oxide, carbonate or hydroxide materials, after leaching, the solids are separated from the solution (e.g., in a thickener), and the solids are sent to the CCD circuit to recover metals values from the entrained solution. For the sulphide concentrates containing carbonates, the sulphide concentrate is separated from the solution (e.g., in a thickener), and the solids are sent to an autoclave feed tank as part of the sulphide concentrate added in the sulphide feed slurry. For all the above materials, the overflow solution is then treated in solution purification.

Solution Purification

The process includes two stages of solution purification, a first solution purification stage and a second solution purification stage, as shown in FIGS. 1 to 6. Depending on the solvent extraction configuration and/or use of atmospheric leaching described above, the following solutions are treated in a stage of solution purification:

i. For two step solvent extraction without atmospheric leaching to neutralize free acid in the raffinate from the primary solvent extraction step, the primary and secondary solvent extraction raffinate solutions are treated by solution purification;

ii. For two step solvent extraction with atmospheric leaching to neutralize free acid in the raffinate from the primary solvent extraction step, the atmospheric leach thickener overflow solution and the secondary solvent extraction raffinate solutions are treated by solution purification; or iii. For single step solvent extraction, the CCD overflow solution and the solvent extraction raffinate solution are treated by solution purification.

In each solution purification stage, the respective solution is neutralized (for example with limestone) to remove free acid and/or to precipitate iron, aluminum, chromium and/or silicon from solution. Air is added to the solution purification reactors to oxidize ferrous iron to ferric iron and, in embodiments using limestone for neutralization, to sweep carbon dioxide from the slurry. The solids are separated from the resulting solution, preferably in a thickener, to produce an overflow solution, which proceeds to the next step in the process and an underflow slurry, which is returned to a previous step in the process. These circuits typically operate between 50 and 90° C.

When adjusting the pH of the sulphate solutions containing nickel and cobalt, nickel and cobalt are prone to co-precipitation, particularly in the presence of, or during the precipitation of, iron compounds, resulting in nickel and cobalt losses to the solids. At higher pH (for example, pH 4.5 to 5.5), copper also precipitates from solution as a copper hydroxide or basic copper sulphate. Recycle of the solids from solution purification to a circuit operating with sufficient free acid to redissolve any precipitated nickel, cobalt or copper allows any co-precipitated nickel or cobalt or precipitated copper to be recovered.

After solution purification, any copper remaining in the feed solution to either the hydroxide or the sulphide precipitation step is precipitated with the nickel and cobalt hydroxides or sulphides. If copper is acceptable in the mixed sulphide or hydroxide product, Stage II of solution purification can be operated at a lower pH range in which copper is either not precipitated or is precipitated to a lesser degree. Otherwise, Stage II of solution can be operated at a pH range in which all or a portion of the copper precipitates and the resulting solids can be separated from the solution, and recycled within the process to recover the copper values.

The solution purification solids slurry from each of the first and second stages of solution purification contains entrained solution which is reduced in free acid (i.e., neutralized in solution purification) and in copper (i.e., removed in solvent extraction). Thus, the recycle of this slurry to an earlier stage of solution purification or to the CCD effectively lowers the free acid and copper concentration in the solution feeds to the solvent extraction step(s). Lowering the free acid or copper concentrations in solution contributes to improved copper recovery in the solvent extraction step(s).

Depending on the method of metals recovery (i.e., mixed hydroxide (MH) or mixed sulphide (MS) precipitation), the conditions used in the solution purification stages may differ, as set out below.

A. Solution Purification for Metals Recovery by Mixed Hydroxide Precipitation

To produce a solution low in aluminum and iron for mixed hydroxide precipitation, operating at higher pH in both a first and a second solution purification stage is preferred to reduce these impurities to low levels in solution, but this may lead to co-precipitation and/or loss of nickel and cobalt from the solutions. To address these issues, the following steps are included in some embodiments of the process:
 i. Two stages of Solution Purification, with Stage I operating at lower pH (pH 3.5 to 3.8) to precipitate ferric iron and a portion of the aluminum while minimizing the amount of co-precipitation of nickel, copper and cobalt and Stage II operating at higher pH (pH 4.5 to 5.5) to remove the remaining iron and aluminum in solution while precipitating all or a portion of the copper from the solution and limiting the amount of co-precipitation of nickel and cobalt precipitation;
 ii. Thickening of the resulting slurry and recycle of the underflow slurry from each stage to either the previous solution purification step (i.e., Stage II Solution Purification Solids to Stage I) or directly to the CCD to redissolve any precipitated copper, nickel or cobalt and to recover soluble nickel, cobalt and/or copper values entrained in the underflow slurry; and
 iii. Addition of Stage II Mixed Hydroxide Precipitate in the first tank in one or both of Stage I or Stage II of Solution Purification to redissolve the contained metals in acidic solution, prior to adding limestone, and to recycle these metals values to mixed hydroxide precipitation.

The overflow solution from the first solution purification stage (first purified solution) is then treated in a solvent extraction step for copper recovery. The overflow solution from the second solution purification stage (second purified solution) is then treated for metals recovery by mixed hydroxide precipitation.

B. Solution Purification for Metals Recovery by Mixed Sulphide Precipitation

Sulphide precipitation is less sensitive to the concentrations of impurities, such as iron and aluminum. Precipitation of over 98% of the nickel and cobalt in solution is possible with sulphide precipitation in the presence of significant concentrations of aluminum and ferrous iron in solution.

Exemplary embodiments of sulphide precipitation include solution purification in the following two stages:
 i. One stage of solution purification (Stage I) operating at higher pH (ex. 3.5 to 3.8) to neutralize free acid and remove ferric iron and a portion of the aluminum, to minimize transfer of soluble impurity elements to the solvent extraction circuit and to provide low free acid levels to the following solvent extraction step; and
 ii. One stage of solution purification (Stage II) operating at lower pH (ex. pH 2 to 4) to neutralize free acid prior to sulphide precipitation; or one stage of solution purification (Stage II) operating at higher pH (ex. 4.5 to 5.5) to neutralize free acid prior to sulphide precipitation and to precipitate all or a portion of the copper remaining in solution after solvent extraction for recycle.

The overflow solution from Stage I of solution purification is then treated in a solvent extraction step for copper recovery. The overflow solution from Stage II of solution purification is then treated for metals recovery by mixed sulphide precipitation.

The resulting slurry from each step is also thickened and recycled either to the previous step (i.e., Stage II solution purification solids to Stage I solution purification) or directly to the CCD to redissolve any precipitated copper, nickel or cobalt and to recover soluble copper, nickel and/or cobalt values entrained in the underflow slurry.

Zinc Removal

Depending on the concentration of zinc in solution, optionally zinc may also be removed from the overflow solution from the second stage of solution purification and prior to metals recovery, either by precipitation as a metal sulphide (e.g., with the addition of $H_2S$) or by precipitation as a metal hydroxide (e.g., with the addition of MgO or NaOH). Removal prior to metals recovery reduces the zinc concentration in the mixed hydroxide or mixed sulphide products from this process.

Nickel and Cobalt Recovery

Nickel and cobalt recovery from the second purified solution from the second solution purification stage, or from the solution of the optional zinc removal, is accomplished by precipitation of either mixed hydroxide precipitates (MHP) or mixed sulphide precipitates (MSP).

A. Mixed Hydroxide Precipitation

Mixed hydroxide precipitation is accomplished by adding a base, such as MgO, NaOH and/or $Ca(OH)_2$, to the solution to precipitate nickel and cobalt hydroxides. However, manganese may also precipitate along with cobalt and nickel, especially at higher pH. Thus, in some embodiments, mixed hydroxide precipitation is performed in two stages:
 i. Stage I—Partial precipitation (75 to 95%) of the cobalt and nickel to produce a higher purity product, lower in manganese, with MgO or NaOH as the neutralizing agent; and
 ii. Stage II—Complete precipitation of the remaining cobalt and nickel, along with a portion of the manganese, using lime $(Ca(OH)_2)$ to produce a material that can be recycled to recover the contained cobalt and nickel values.

If any copper or zinc are present in the feed solution to metals recovery, they are expected to precipitate along with cobalt and nickel in the mixed hydroxide.

Liquid solid separation, for example by thickening and/or filtration, is used to separate the mixed hydroxide precipitate from the solution in each stage. The solution from Stage I continues onto Stage II for further nickel/cobalt precipitation and the solids from Stage I are the main cobalt/nickel product from this process, if mixed hydroxide precipitation is used for metals recovery, and can be subsequently purified or upgraded to produce nickel and cobalt as metals or as high purity hydroxide, oxides or sulphates.

A portion of the solution from Stage II is recycled, for example as wash water in the CCD circuit, with the remainder going for treatment in tailings neutralization. The Stage II mixed hydroxide solids are recycled to one or both of the first and/or second stage solution purification steps to dissolve the contained nickel and cobalt values in the acidic solutions feeding those circuits.

B. Mixed Sulphide Precipitation

Recovery of nickel and cobalt by mixed sulphide precipitation from high pressure acid leach (HPAL) solutions is widely practiced and the conditions are well known to those skilled in the art. Precipitation with hydrogen sulphide ($H_2S$) gas is typically performed at temperatures between 70 and 120° C. at $H_2S$ pressures of 50 to 700 kPa in pressurized stirred tank reactors and/or autoclaves. The extent of sulphide precipitation is limited by the generation of free acid in the precipitation reactions (e.g., $NiSO_4+H_2S=H_2SO_4+NiS$). Thus, the extent of nickel and cobalt precipitation typically decreases as the concentration of nickel and cobalt in solution increases.

Two embodiments are described below to increase the extent of nickel and cobalt precipitation to allow for either improved nickel and cobalt recovery, or to maintain high nickel and cobalt recoveries with higher concentrations of nickel and cobalt in the feed solution to mixed sulphide precipitation.

In one embodiment, a neutralizing agent is optionally added in mixed sulphide precipitation as a method to lower the free acid concentration during precipitation. To maintain a high purity in the mixed sulphide product, the type of neutralizing agent is selected to be both, soluble in sulphuric acid and not precipitated by $H_2S$, and, if solid, is added in a low enough dosage so that it fully reacts (i.e., no unreacted solid reagent is left in the product). Examples of suitable reagents include:
  i. Oxides or hydroxides of magnesium, manganese sodium, potassium or aluminum; and/or
  ii. Polynuclear aluminum, as described in U.S. Pat. No. 8,147,781 to Holloway et al.

In a second embodiment, mixed nickel/cobalt hydroxide may also be used to lower the free acid concentration. In this case, manganese hydroxides, or unreacted magnesium oxide, in the mixed hydroxides react to lower the free acid concentration during precipitation, while nickel and cobalt hydroxides are dissolved and re-precipitated at metal sulphides, with no net increase in acid concentration (e.g. $Ni(OH)_2+H_2S=2\ H_2O+NiS$). In this embodiment, magnesium and manganese are removed from the mixed hydroxide while converting the nickel and cobalt hydroxides to sulphides. Magnesium or manganese sulphates entrained in the mixed hydroxides report to the barren solution.

Liquid solid separation (e.g., thickening) is used to separate the barren precipitation solution from the mixed sulphide precipitate and to wash the mixed sulphides. A portion of the overflow solution may be neutralized with limestone and recycled to the plant (e.g. as wash water in CCD), with the remainder going for treatment in tailings neutralization.

The washed mixed sulphide is the main cobalt/nickel product from this process, if mixed sulphide precipitation is used for metals recovery, and can be subsequently purified or upgraded to produce nickel and cobalt as metals or metal sulphates.

Gold/Silver Recovery from CCD Underflow Slurry

Optionally, if the sulphide concentrate feed contains gold, gold and any cyanide soluble silver, may be recovered in a gold/silver recovery step by cyanidation of the washed underflow slurry from the final stage of the CCD circuit.

Cyanidation practice is well known to those skilled in the art. In some embodiments, the pH of the washed CCD underflow is adjusted to pH 10 to 11.5 with lime and then cyanide is added along with air in agitated stirred tanks to dissolve the cyanide soluble gold and/or silver values. Activated carbon is added in either a carbon in pulp (CIP) or carbon in leach (CIL) configuration to recover the gold and silver by adsorption onto activated carbon. At the end of the cyanidation circuit, activated carbon is recovered by wet screening and is treated for the recovery of gold and silver and the carbon free slurry is treated by one of several methods known to those skilled in the art to destroy cyanide and detoxify the slurry prior to disposal (e.g., $SO_2$/air oxidation, chlorination, etc.).

The cyanide destruction slurry is then forwarded to tailings neutralization where it is combined with the barren solution from metals recovery for neutralization prior to disposal.

Tailings Neutralization

In tailings neutralization, the following materials are combined and neutralized to precipitate residual free acid and most metals from solution:
  i. Barren solution from the second stage of mixed hydroxide precipitation or barren solution from mixed sulphide precipitation; and
  ii. Underflow slurry from the final CCD thickener or the slurry from the cyanide destruction/detoxification step from the optional gold/silver recovery step.

A combination of limestone and lime is added to precipitate the metals as hydroxide and sulphate as gypsum. Approximately 100% of the remaining Al, As, Cr, Co, Cu, Fe, Ni and Zn are precipitated from solution. Manganese is precipitated, along with a portion of the magnesium, to reduce the manganese concentrations to levels acceptable for disposal. The resulting slurry is then sent to a tailings facility for impoundment.

Features/Advantages

In some embodiments, simultaneous co-processing by the process of this disclosure provides one or more process features and advantages, including:
  i. processing sulphide concentrates containing arsenic, antimony, or bismuth, such that copper is recovered, without the problems of sulphur dioxide or arsenic emissions or gas handling equipment, and a solid residue containing the majority of the arsenic, antimony, bismuth in an environmentally stable form is produced;
  ii. processing copper concentrates containing high concentrations of arsenic and/or antimony while maintaining nickel extractions above target levels (>92%) through control of the leaching retention time and the Fe:As and/or Fe:Sb mole ratio in the sulphide concentrate;

iii. decreased leach reactor volume for overall leaching of the combined feed materials, compared to leaching the sulphide concentrate and laterite ores separately;

iv. processing of sulphide concentrates containing copper and high levels of arsenic without the limitations of arsenic/iron ratio in the concentrate on copper extraction and residue stability encountered when processing the sulphide concentrate alone;

v. consumption of the acid generated by sulphide oxidation (i.e., by nickel laterite ore) without requiring integration with a copper heap leach operation;

vi. elimination of the need for preheating of the laterite ore and elimination of the need for purchase or separate production of sulphuric acid to leach the laterite ore, vii. recovery of copper from laterite and sulphide concentrate as copper cathode instead of as a lower grade sulphide product;

viii. recovery nickel and cobalt from laterite and sulphide concentrate as either a mixed hydroxide or mixed sulphide precipitate; and ix. purifying the leach solutions to minimize the loss of soluble nickel and cobalt to the leach residue.

The co-processing process of this disclosure addresses certain limits on current processing of nickel/cobalt ores. The high capital and operating costs of process plants, the low nickel/cobalt grades in the laterite ores and the low purity intermediate products from high pressure acid leaching (HPAL) of laterites limit the profitability and/or the development of additional HPAL plants, particularly at nickel prices of $7/lb or lower. As a result, most of the current expansion in nickel production from laterite has focused on technologies where iron values are recovered, in addition to nickel, such as direct shipping of ore for nickel pig iron production (limonite ore) or expanded ferronickel production (saprolite ores).

The ability of the process of this disclosure to handle sulphide concentrates not normally treated in conventional pyrometallurgical smelters or hydrometallurgical (SX/EW) plants provides additional opportunities to make use of sulphide materials that are not normally utilized. For example, in this process, a number of the elements that are deleterious to pyrometallurgical copper smelters, such as Sb, As, and Bi, dissolve and precipitate along with iron. The flexibility of the process also allows for the processing of more complex or variable sulphide feeds.

The combination of these two issues (challenges in the profitability of processing laterite with HPAL and the feasibility of processing complex, low grade or high impurity sulphide concentrates) provides opportunities to expand production for both laterite ores and base metal sulphide concentrates that were not previously available.

Copper, nickel, cobalt and zinc in the concentrate are leached along with the copper, nickel, cobalt and zinc from the laterite ore into a single leach solution, typically over 95% from both the sulphide and laterite feeds, allowing them to be recovered in common metals recovery steps. This allows the potential to recover metals values from the copper concentrates that may not normally be possible in a pyrometallurgical copper refinery.

Because of the high iron content of the laterite ore added in the pressure leach, the resulting solids are highly stable environmentally, as measured by the Toxicity Characteristic Leaching Procedure (TCLP).

With the process operating above 230° C., elemental sulphur formation from the sulphide concentrates is minimal, the surfaces of the sulphide minerals are not passivated. Because of the rapid kinetics at these temperatures, sulphide oxidation and leaching of base metals can occur, generally without regrinding of the flotation concentrate prior to leaching, or the addition of chlorides or other additives to the autoclave to prevent passivation.

The sulphuric acid generated, in addition to that required to leach the sulphide concentrate, is used for leaching nickel laterite in the same autoclave system, such that another separate leaching circuit is not required to consume the majority of the acid produced. The laterite ore acts effectively as a neutralizing agent for the acid produced by oxidation of the sulphides and the nickel and cobalt values leached from the laterite ore values offset the cost of the neutralization and precipitation of the sulphate and metals values.

Using the sulphuric acid produced to leach nickel laterites allows for significant simplifications of the plant water balance, compared with integration with a heap leach of copper oxide ores or secondary sulphide ores. Water comes into the plant in the preparation of the concentrate, laterite ore, and limestone/lime slurries and as quench solution to the autoclave or wash water to liquid solid separation. Solution from mixed hydroxide or mixed sulphide precipitation is recycled as wash solution. After the CCD and either mixed hydroxide or mixed sulphide precipitation, the waste streams are neutralized with limestone/lime to precipitate most metals, with the exception of magnesium, to low levels. Magnesium sulphate solution, free of other metals, then can typically be safely disposed of to the ocean, used in other facilities (e.g., heap leaching operations) or potentially recycled back into the process. Solution or solids bleeds are present for all major elements present in the concentrate and/or laterite feeds.

Copper is recovered from the leach solution using solvent extraction. While the concentrations of copper and free acid in the leach solution may be high, there are several stages of neutralization (i.e., slurry neutralization after the autoclave, and two stages of solution purification), where the free acid concentration is lowered effectively to allow for high extractions of copper from the solution. Copper solvent extraction reagents (e.g., mixtures of ketoximes and/or aldoximes, such as Acorga® M5640 produced by Solvay S.A. or LIX® 984N produced by BASF) are able to operate in acidic pH, and are selective to copper over most impurity elements, with iron being the major impurity of issue. Adding neutralizing agents to maintain a certain pH in solvent extraction is not required for high recoveries and the extractants do not break down in the presence of cobalt or manganese from the leach solutions. These reagents are commonly used for extracting copper from copper oxide/sulphide heap leach solutions with high concentrations of impurity elements and from leaching of copper/cobalt ores, which are often high in cobalt or manganese. With this high selectivity, copper can be extracted from the leach solutions, and then stripped from the organic phase, to generate loaded electrolyte for copper electrowinning. The copper loaded in solvent extraction, whether from the sulphide concentrate or the laterite, is ultimately recovered as copper cathode, rather than as a low purity copper sulphide or hydroxide product.

The raffinate solution from copper solvent extraction contains the nickel and cobalt in solution, and most other impurities at levels similar to solutions generated by HPAL treatment of nickel laterites. The solution is then purified by neutralizing free acid values and precipitating Al, Cr, and Fe as metal hydroxides and Si with limestone. Nickel and cobalt from the laterite ore and from the sulphide feeds contained in this purified solution are recovered as a mixed hydroxide or mixed sulphide product. Mixed hydroxide precipitation and sulphide precipitation, with the optional addition of neutralizing agents during sulphide precipitation, are not sensitive to the metals concentrations in the feed solution to sulphide precipitation.

Mixed hydroxide is a preferred precursor material for the generation of battery precursors. The mixed hydroxide is redissolved to prepare solutions with high nickel and cobalt concentrations, and the nickel and cobalt, and other impurities, can be separated in much smaller equipment than is used to extract these values from laterite ore and closer to battery markets. Mixed sulphide can also readily be refined and converted to nickel and cobalt metal or metal sulphates.

For concentrates containing arsenic, the high iron content of the laterite ore, in combination with the addition of arsenical sulphide concentrates to the process, allows arsenic to be leached and reprecipitated in a highly environmentally stable form, regardless of the Fe:As mol ratio of the concentrate, as the Fe:As mol ratio in the combined sulphide/laterite feed solids is generally very high (i.e., over 20:1). Analyses of arsenic in TCLP leachate from this process are typically less than 0.05 mg/L As, and often less than 0.01 mg/L As, as compared to the legally defined TCLP limit of 5 mg/L, even when processing concentrates with a low Fe:As mole ratio in the concentrate.

In some embodiments, high copper extractions (typically 96 to 98%) are achieved, and maintained during leaching, indicating that losses due to the formation of copper arsenates are minimal in this process.

The amount of copper sulphide that can be added to the autoclave in this process is similar to, or higher than the amount that is added under the operating conditions proposed for high temperature oxidation of copper sulphide concentrates (200 to 230° C.). Operating at higher temperatures requires that more concentrate is added per unit volume to maintain the autoclave temperature autothermally. Laterite slurry, instead of quench solution, provides the primary heat sink for the process.

An important feature of this process is that the acid addition is controlled by the ratio of concentrate:laterite ore to target the ratio of acid required to dissolve the soluble metals in the laterite and in the sulphide feed. Practically, this includes adding sufficient acid for the dissolution of the acid soluble divalent elements, such as Ca, Co, Co, Pb, Mg, Mn, Ni and Zn, trivalent ions, such as ferric iron, chromium and aluminum, precipitation of a portion of the aluminum as alunite (($H_3OAl_3(SO_4)_2(OH)_6$), and the additional acid at temperature required due to the formation of magnesium bisulphates (e.g., $Mg_5(SO_4)_2(HSO_4)_6$) at the operating temperature of the autoclave. Each metal extracts or precipitates to varying degrees, and this element deportment must be accounted for to control the acid addition.

The process is less sensitive to the solids content of the laterite ore feed thickener underflow slurry, compared to HPAL processing. Within the prescribed ranges of operation, lower feed thickener underflow solids contents for the laterite ore can be compensated for by reducing quench flows to the autoclave.

By supplying sulphide concentrate and oxygen to a leaching autoclave along with nickel laterite ore, the process provides both a source of energy to heat the incoming feed slurry and generates sulphuric acid, neither of which can be accomplished by chemical reactions within the autoclave in conventional HPAL processes. The process can be operated such that preheating of the autoclave feed slurry is not required, such that the feed slurry is not diluted by direct steam addition to the autoclave. A much smaller volume of quench solution can be added, as required, to maintain autothermal operation of the autoclave. No acid plant may be required and steam is only added to the autoclave to heat the vessel prior to the initial startup.

The autoclave discharge slurry can be let down to below 100° C. and atmospheric pressure in a series of flash tanks or through an indirect slurry cooler/heat exchanger. The steam generated from the discharge slurry can be recovered, either to provide heating in other parts of the plant or to potentially generate power.

An oxygen plant is used to provide oxygen to oxidize sulphide sulphur in the autoclave. Oxygen plants can be turned down, or started up or shut down more easily than sulphuric acid plants. The cost of oxygen generation consists primarily of the cost of power, and, thus, the operating costs for the plant are linked to the cost of power, rather than to the price of sulphur.

Because the copper solvent extraction step(s) in the process generate sulphuric acid, the Stage II MHP precipitate can be redissolved in the acidic solution feed to one or both of the solution purification steps. This reduces the amount of the contained soluble nickel and cobalt that is exposed to potential loss in the countercurrent decantation wash step, as compared to conventional practice in HPAL plants producing MHP precipitate as a product of adding the nickel and cobalt before the CCD.

Compared to processes which add elemental sulphur, pyrrhotite, pyrite, furnace matte and/or ferrous sulphate as the main sources of sulphur and/or acid to the process, in the present process, the addition of higher value, base metal sulphides, and the addition of copper solvent extraction and electrowinning steps to recover copper, allows for the processing of higher value materials, and provides the ability to recover copper, cobalt and nickel values from the sulphide concentrates and the laterite ores fed to the process as high value products. Further, copper recovery as cathode produces a much higher value product than an impure copper sulphide byproduct.

Solvent extraction is not used in this process for the recovery of Co, Mn, Ni or Zn from solution. Using copper solvent extraction with aldoxime/ketoxime reagents in solvent extraction steps in the process avoids problems associated with direct solvent extraction of metals from laterite solutions (i.e., pH control, degradation of or loss of extractants, cross contamination of extractants when using multiple different SX extractants, etc.) that has been practiced commercially.

This process provides specific methods of free acid neutralization and/or solution purification that do not lead to significant insoluble losses of nickel, cobalt or copper from the leach solution. The methods of this process include multiple solution purification/neutralization stages to limit the precipitation of nickel and cobalt, and methods to limit copper losses and the amount of copper and other impurities reporting to the nickel and cobalt products. In some embodiments, the process includes methods to recycle and recover the low levels of nickel, cobalt or copper that may be coprecipitated during these solution purification stages.

The process provides specific methods for copper recovery to recover >95%, and preferably >99% of the copper in the feed solution. The combination of multiple solution purification stages, one or more solvent extraction steps, and various solution/slurry recycles allow for high copper recoveries over a wide range of copper concentrations.

The invention is further illustrated in the following non-limiting examples.

EXAMPLES

Example 1

Batch pressure leach tests were performed with two laterite ores: Laterite 1 (Low Mg/Si, High Fe) and Laterite 2 (High Mg/Si, Lower Fe). Both ores are oxidizing ores, in that they generate chromium(VI) when leaching at high temperatures under acidic conditions without the addition of an additional oxidant or reductant. The composition of these laterite ores are shown in Table 1.

TABLE 1

| | Laterite Ore Analysis, wt % | | | | | | | | | |
|---|---|---|---|---|---|---|---|---|---|---|
| | Al | C | Cr | Cu | Co | Fe | Mg | Mn | Ni | Si | Zn |
| Laterite 1 | 3.94 | 0.21 | 2.08 | 0.03 | 0.24 | 49.7 | 0.36 | 1.27 | 1.05 | 1.03 | 0.05 |
| Laterite 2 | 1.95 | 0.10 | 1.87 | 0.01 | 0.08 | 34.2 | 6.66 | 0.58 | 1.96 | 9.17 | 0.04 |

In these tests, a high arsenic concentrate (Concentrate A) and two concentrates with lower arsenic concentrations (Concentrates B and C) were blended at various ratios. Laterite 1 was leached along with mixtures of Concentrate A and B, while Laterite 2 was leached along with mixtures of concentrates A and C. The composition of these concentrates is shown in Table 2. Concentrates A and B contains arsenic and/or antimony at concentrations that would not normally allow them to be processed in a pyrometallurgical copper refinery.

TABLE 2

| Concentrate | Concentrate Analysis, wt % | | | | | | | | |
|---|---|---|---|---|---|---|---|---|---|
| | Al | Sb | As | Cu | Fe | Pb | Si | $S^{2-}$ | Zn |
| A | 0.50 | 0.30 | 7.33 | 21.9 | 23.7 | 0.20 | 1.79 | 42.0 | 0.30 |
| B | 0.71 | 0.04 | 1.10 | 25.6 | 24.2 | 0.17 | 3.01 | 35.2 | 3.04 |
| C | 0.14 | <0.02 | <0.03 | 23.3 | 36.3 | <0.03 | 0.43 | 40.3 | 0.36 |

The ratio of concentrate:laterite for each test was set to provide the acid required for the leaching of the concentrate and laterite ore. For the tests with the lower magnesium Laterite 1, the concentrate A:B mixture was added at 25 to 33% of the total solids added. For the higher magnesium Laterite 2, the concentrate A:C mixture was added at between 41 and 42% of the total solids added to match the higher acid requirement for this ore.

Figure 7:
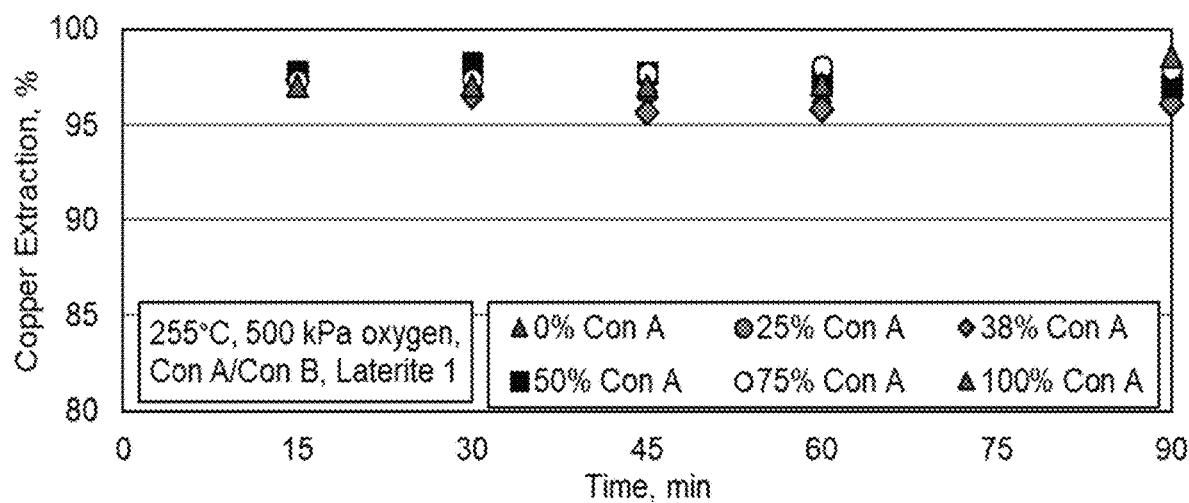
FIGS. 7-20 are graphs with experimental and piloting results, and a flowsheet for solvent extraction, as described more fully in the Examples which follow.
Figure 7:
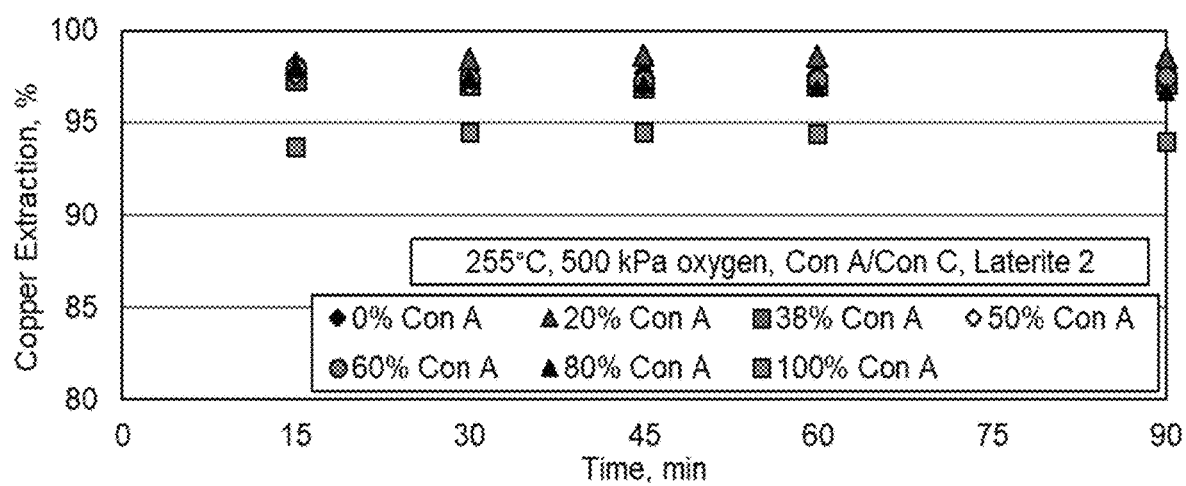
Figure 8:
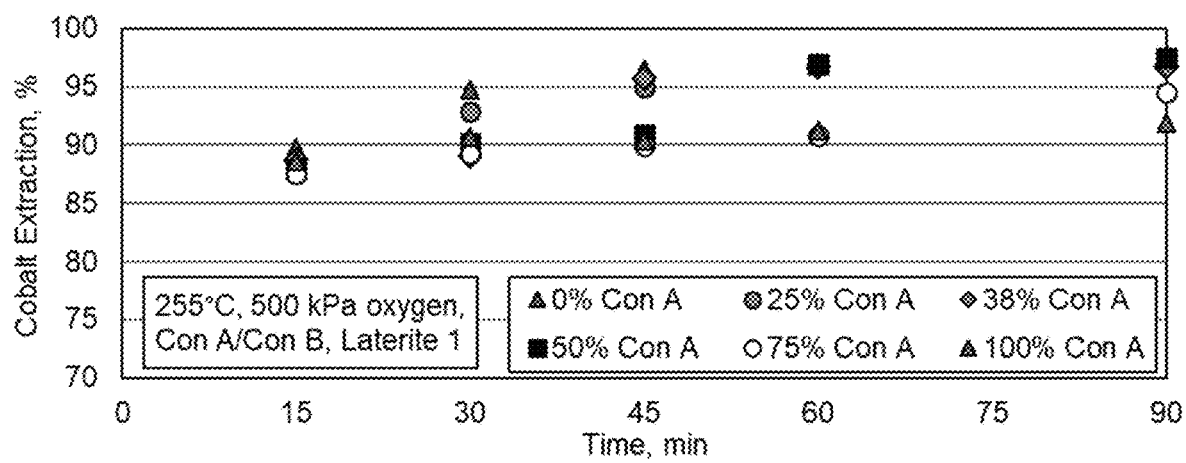
Figure 8:
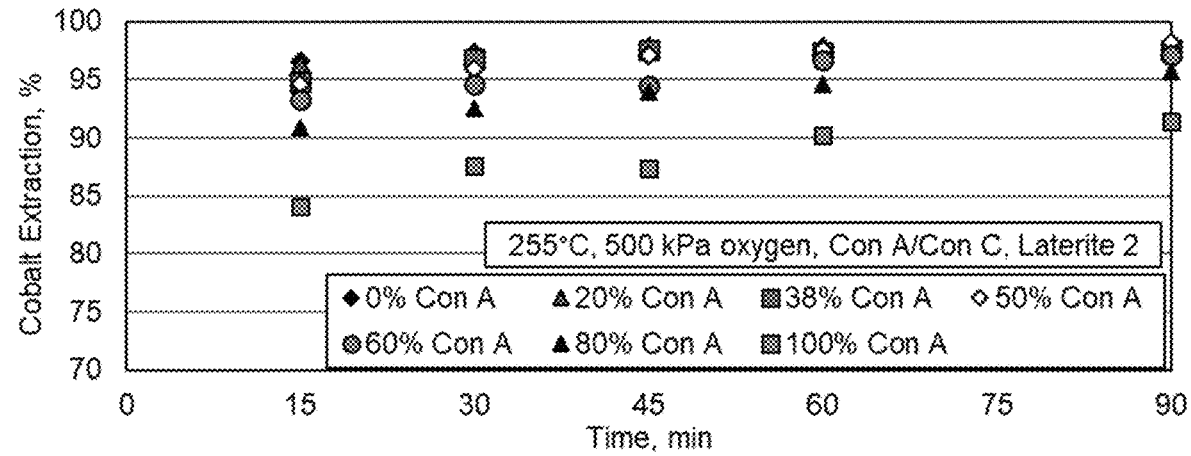
Figure 9:
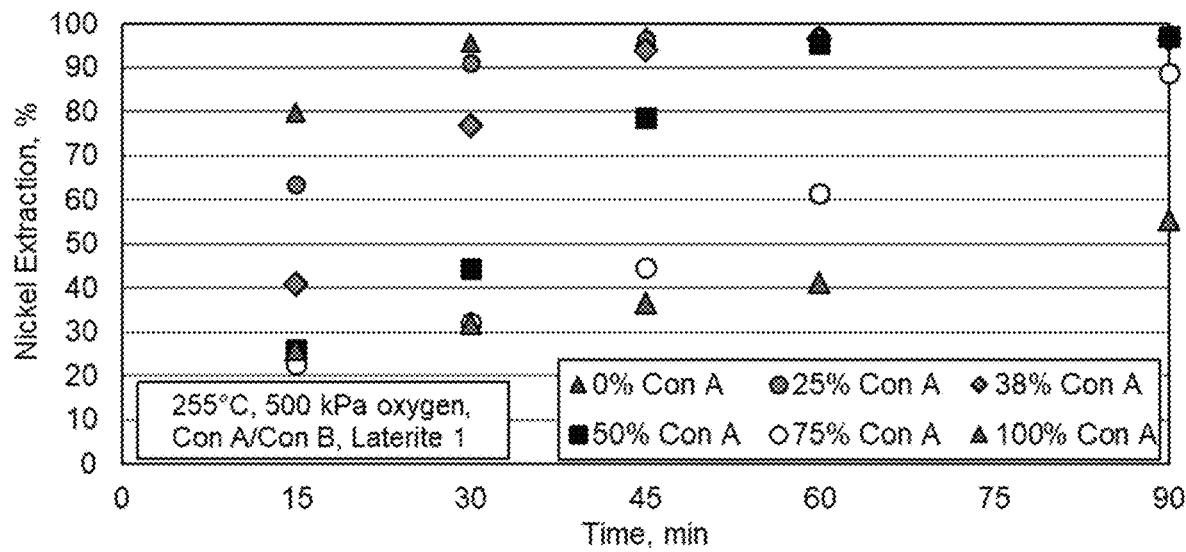
Figure 9:
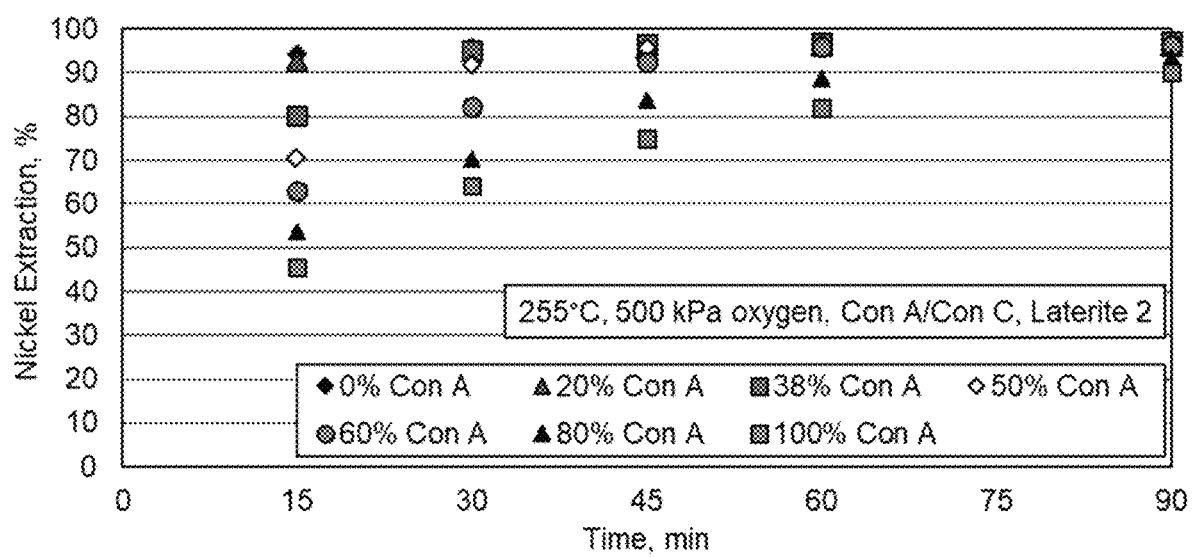

Concentrate, laterite and water were added to the autoclave to target the solids concentration in the aqueous feed slurry for autogeneous operation of a commercial autoclave under the target leaching conditions. For the tests with Laterite 1, the solids concentrations in the autoclave for autogeneous operation were between 30.4 and 35.4 wt % and, for Laterite 2, the solids concentrations in the autoclave were between 23.0 to 23.3 wt %, The batch pressure leach tests were performed at 255° C. with an oxygen partial pressure of 500 kPa. The tests were heated to 205° C. and then oxygen was applied. The heat of the oxidation reaction heated the autoclave to the operating temperature and the operating temperature was then maintained using a cooling coil in the autoclave. FIGS. 7 to 9 show the rates of copper, nickel and cobalt extractions for those two series of tests (Con A/Con B and Laterite 1, and Con A/Con C and Laterite 2). Leaching of copper from the concentrate was rapid, with over 94% extraction, and typically over 97% Cu extraction, within 15 minutes. Arsenic was leached from the concentrate and then precipitated, with 94%, and typically greater than 99%, of the arsenic in the feed solids reporting to the pressure leach residue.

Leaching of cobalt from the laterite ores follows two different modes: rapid initial leaching of cobalt in the first 15 minutes (i.e., leaching of asbolane/asbolite) and continued leaching at longer reaction times (i.e., leaching of cobalt from goethite). The rate and extent of cobalt leaching, particularly from the goethite minerals, decreases as the amount of arsenic into the system increased (i.e., a higher percentage of Con A) for both laterite ores.

The effect of higher arsenic addition (i.e. higher percentages of Con A) had a more drastic effect on the leaching of nickel. Over 95% nickel extraction was reached by the 30 minute sample when no Con A was added, but, as the percentage of Con A, and, thus, the arsenic in the combined concentrate, increased, longer reaction times were required to reach nickel extractions of over 95%. At the highest additions (75 to 100% Con A), 95% nickel extraction was not reached within 90 minutes.

A variety of parameters including the Fe:As mole ratio in the total feed (sulphide concentrate+laterite), arsenic in total feed, and Fe:As mole ratio in the concentrate, were then plotted for the two test series to determine if there was a consistent trend observed with one of these relationships.

Figure 10:
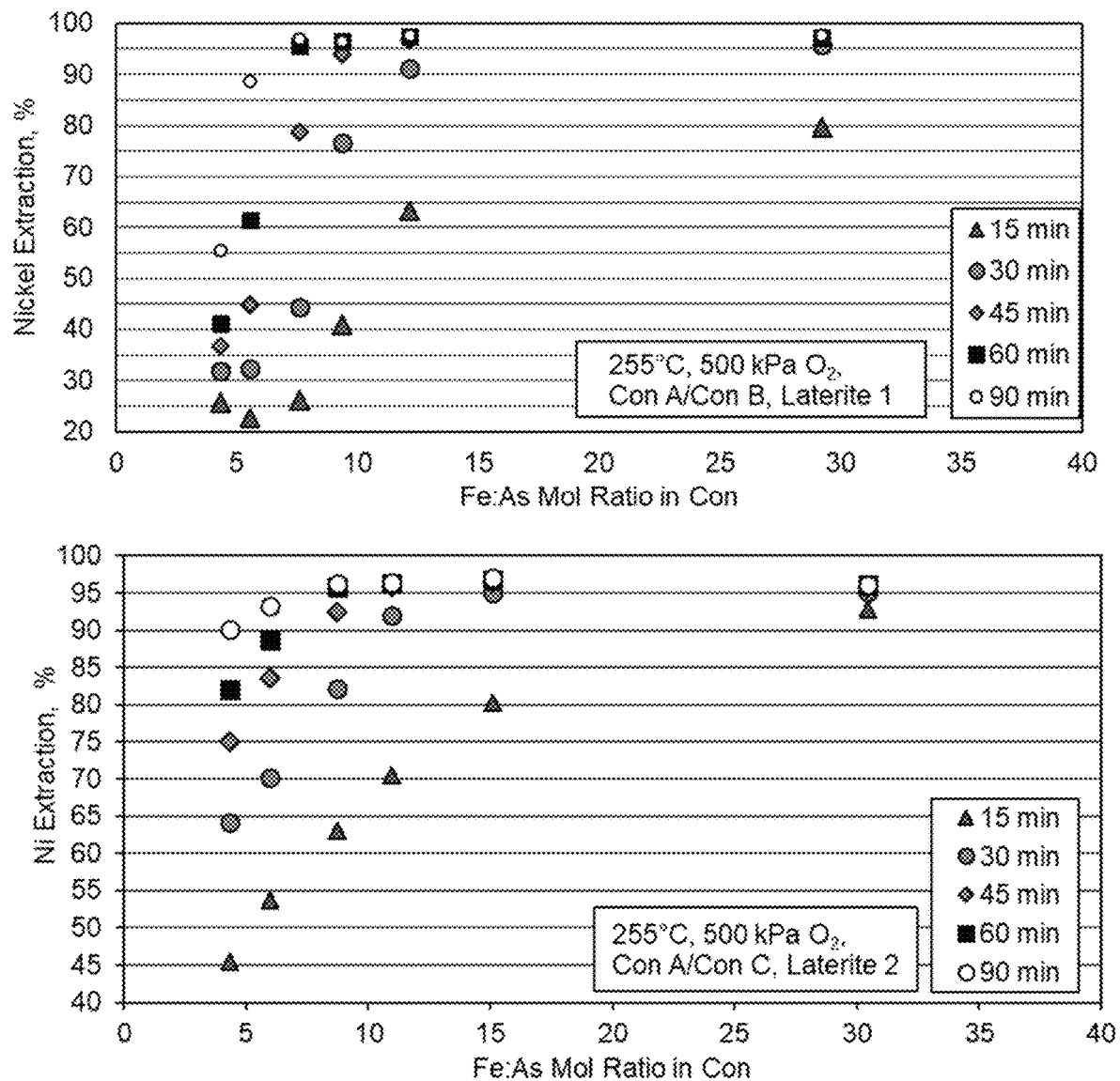

FIG. 10 shows the nickel extraction vs. the Fe:As mole ratio in the concentrate for various autoclave reaction times. A decrease in nickel extraction is observed as the Fe:As mole ratio in the concentrate feed decreased for each retention time and for both series of tests with different concentrate blends or laterite ores added.

The transition point where 95% nickel extraction is reached for various autoclave reaction times was determined from these graphs, and is summarized in Table 3. The reaction time in the batch leach tests is provided, along with an approximation of the continuous retention time, based on past experience in the scale up of pressure leach reactors.

TABLE 3

| Reaction Time, | Fe:As Mole Ratio in Concentrate for 95% Nickel Extraction | |
|---|---|---|
| min[1] | Laterite 1 | Laterite 2 |
| 45 min (68 min) | 9.8 | 10.0 |
| 60 min (90 min) | 7.6 | 8.2 |
| 90 min (120 min) | 6.8 | 7.2 |

[1]Batch (Continuous)

Very similar values for this transition were determined, despite using two different concentrates, along with the high arsenic Concentrate A, and two laterites with significantly different concentrations of iron and different proportions of goethite and silicate minerals. For continuous operation, this indicates that, when processing laterite ores together with sulphide concentrates containing antimony, nickel extractions of greater than 95% can be achieved at Fe:As mole ratios in the concentrate of >10 for 68 min, >8.2 for 90 min and >7.2 for 120 min for oxidizing laterite ores. Table 4 shows the limits in terms of arsenic in concentrate for the feeds tested.

TABLE 4

| Reaction Time, | Arsenic in Concentrate Feed, % | |
|---|---|---|
| min[1] | Laterite 1 (Con A/B) | Laterite 2 (Con B/C) |
| 45 min (68 min) | 3.3 | 3.9 |
| 60 min (90 min) | 4.2 | 4.7 |
| 90 min (120 min) | 4.7 | 5.3 |

[1]Batch (Continuous)

Example 2

Batch pressure leach tests were performed with another sample of laterite ore that is a reducing ore (i.e., one that generates ferrous iron when leaching at high temperatures under acidic conditions without the addition of an additional oxidant or reductant). The composition of this laterite ore is shown in Table 5.

TABLE 5

| Laterite 3 Ore Analysis, wt % | | | | | | | | | | |
|---|---|---|---|---|---|---|---|---|---|---|
| Al | C | Cr | Cu | Co | Fe | Mg | Mn | Ni | Si | Zn |
| 5.03 | 0.27 | 1.96 | 0.01 | 0.10 | 47.2 | 0.62 | 0.60 | 0.94 | 1.29 | 0.04 |

In these tests, a high arsenic concentrate (Concentrate A) and Concentrate B, with a lower arsenic concentrations, were blended at various ratios. The composition of these concentrates is shown in Table 6. Both Concentrates A and B contains arsenic and/or antimony at concentrations that would not normally allow them to be processed in a pyrometallurgical copper refinery.

TABLE 6

| Concentrate | Concentrate Analysis, wt % | | | | | | | | |
|---|---|---|---|---|---|---|---|---|---|
| | Al | Sb | As | Cu | Fe | Pb | Si | $S^{2-}$ | Zn |
| A | 0.50 | 0.30 | 7.33 | 21.9 | 23.7 | 0.20 | 1.79 | 42.0 | 0.30 |
| B | 0.71 | 0.04 | 1.10 | 25.6 | 24.2 | 0.17 | 3.01 | 35.2 | 3.04 |

The ratio of concentrate:laterite for each test was set to provide the acid required for the leaching of the concentrate and laterite ore and ranged from 35.5% to 25.5% for 0 to 100% Con A. Concentrate, laterite and water were added to the autoclave to target the solids concentration in the aqueous feed slurry for autogeneous operation of a commercial autoclave under the target leaching conditions. This was equivalent to 28.9 to 35.2% solids over the range of 0 to 100% Con A.

Figure 11:
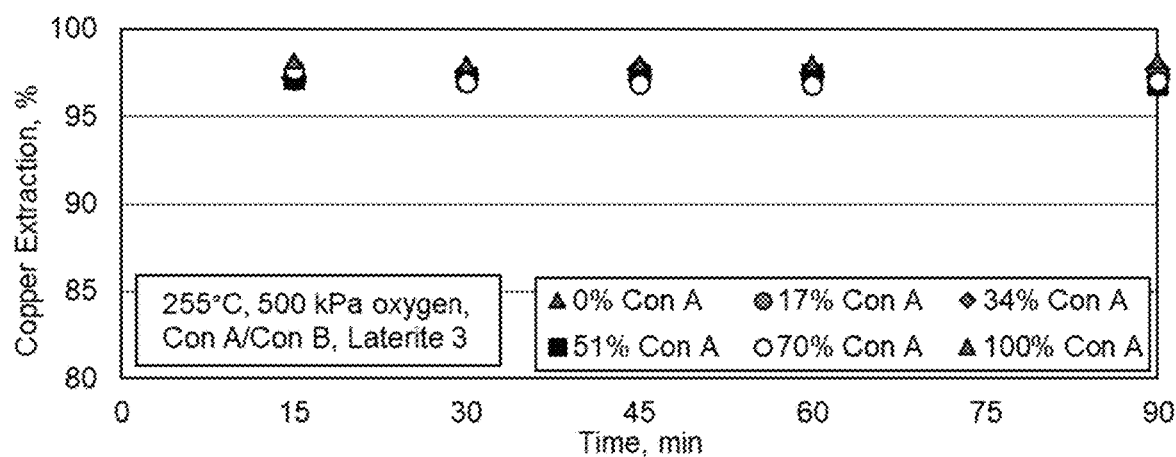
Figure 12:
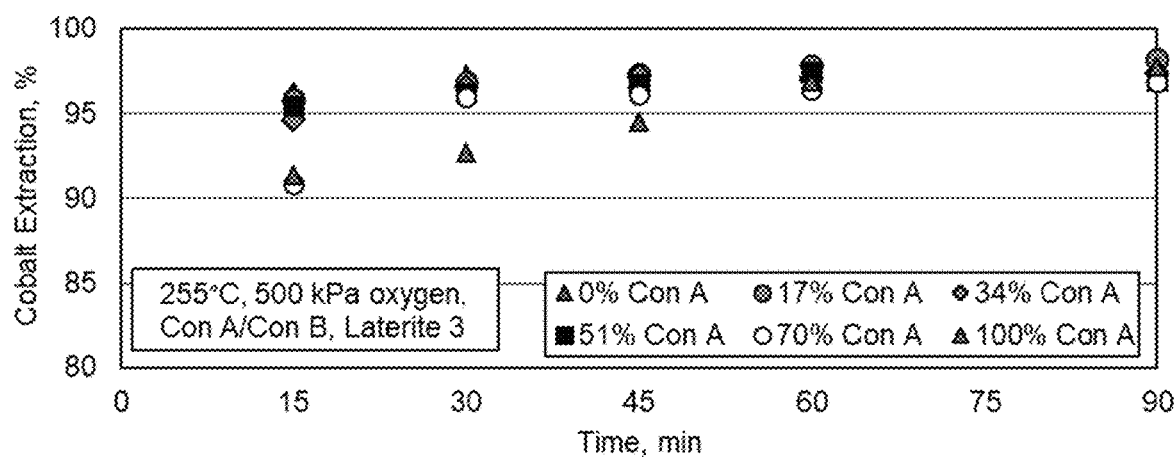
Figure 13:
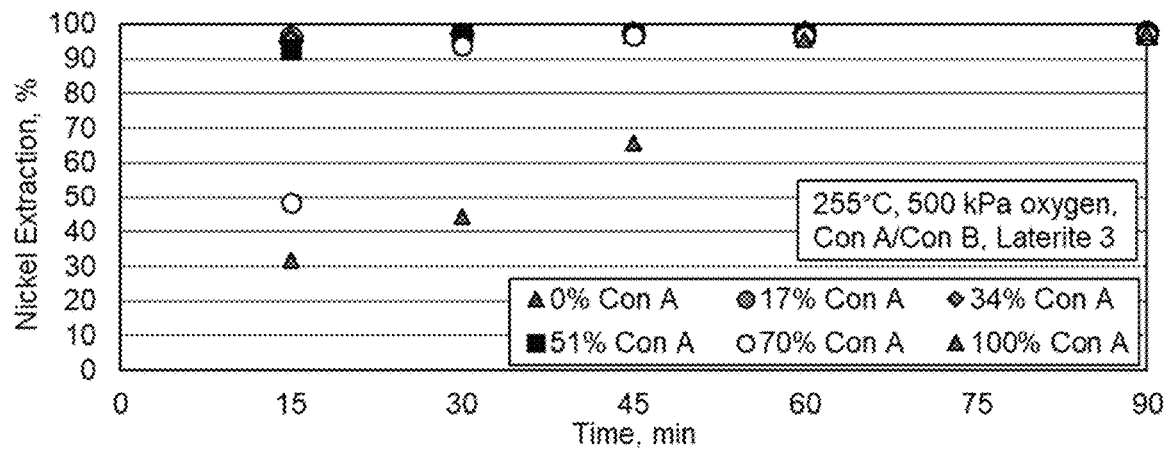

The batch pressure leach tests were performed at 255° C. with an oxygen partial pressure of 500 kPa. The tests were heated to 205° C. and then oxygen was applied. The heat of the oxidation reaction heated the autoclave to the operating temperature and the operating temperature was then maintained using a cooling coil in the autoclave. FIGS. 11 to 13 show the rates of copper, nickel and cobalt extractions for these tests. Leaching of copper from the concentrate was rapid, with over 97% Cu extraction within 15 minutes. The leaching behaviour of cobalt was similar to that in Example 1. Two different modes of leaching were observed: rapid initial leaching of cobalt in the first 15 minutes (i.e., leaching of asbolane/asbolite) and continued leaching at longer reaction times (i.e., leaching of cobalt from goethite). The rate and extent of cobalt leaching, particularly from the goethite minerals, decreases as the amount of arsenic into the system increased (i.e., a higher percentage of Con A).

Arsenic was leached from the concentrate and then precipitated, with 94%, and typically greater than 99%, of the arsenic in the feed solids reporting to the pressure leach residue.

A dropoff in nickel extraction was also observed for this laterite ore with increasing the arsenic addition to the system (i.e., higher percentages of Con A in the concentrate mixture). However, a significant dropoff was not seen until much higher percentages (70 to 100% Con A). It is believed, without being bound by the same, that, with a reducing ore, the oxidation and precipitation of arsenic is slower, which allows for more of ferric iron from the laterite ores to dissolve and react with the arsenic to precipitate it as separate iron arsenate particles. Thus, the characteristics of the reducing ore help reduce the impact of higher arsenic concentrations in the concentrate on nickel extraction.

Figure 14:
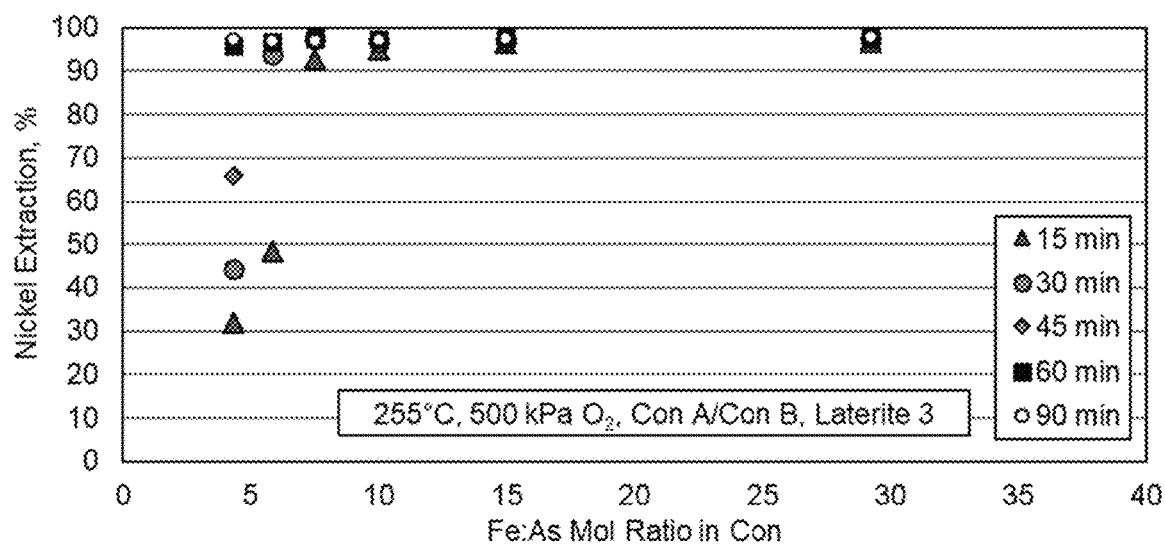

FIG. 14 shows the nickel extraction vs. the Fe:As mole ratio in the concentrate for various autoclave reaction times for this laterite ore. A decrease in nickel extraction is observed as the Fe:As mole ratio in the concentrate feed decreased for the 15, 30, 45 and 60 minute (batch) retention times.

The transition point where 95% nickel extraction is reached for various autoclave reaction times was determined from these graphs, and is summarized in Table 7, with the results from Laterite 1 from Example 1 provided for comparison. The reaction time in the batch leach tests is provided, along with an approximation of the continuous retention time, based on past experience in the scale up of pressure leach reactors.

TABLE 7

| Reaction Time, | Fe:As Mole Ratio in Concentrate for 95% Nickel Extraction | |
|---|---|---|
| min[1] | Laterite 1 (Oxidizing) | Laterite 3 (Reducing) |
| 45 min (68 min) | 9.8 | 5.8 |
| 60 min (90 min) | 7.6 | >4.3 |
| 90 min (120 min) | 6.8 | >4.3 |

[1]Batch (Continuous)

Thus, even though the impact of arsenic on nickel extraction is lower for reducing laterite ores, this shows that nickel extractions of over 95% can be achieved, when processing laterite ores together with sulphide concentrates containing arsenic, by controlling one or both of Fe:As mole ratio in the concentrate and the autoclave retention time. Table 8 shows the limits in terms of arsenic in concentrate for the feeds tested.

TABLE 8

| Reaction Time, | Arsenic in Concentrate Feed (Con A/B), % | |
|---|---|---|
| min[1] | Laterite 1 | Laterite 3 |
| 45 min (68 min) | 3.3 | 5.5 |
| 60 min (90 min) | 4.2 | >7.5 |
| 90 min (120 min) | 4.7 | >7.5 |

[1]Batch (Continuous)

Example 3

Batch pressure leach tests were performed with Concentrate C and one of the oxidizing laterite ores from Example 1 (Laterite 1), but in this series of tests, Concentrate C was blended with varying concentrations of stibnite ($Sb_2S_3$). The composition of the stibnite sample is shown in Table 9.

TABLE 9

| Stibnite Analysis, wt % | | | | | | | | |
|---|---|---|---|---|---|---|---|---|
| Al | Sb | As | Cu | Fe | Pb | Si | $S^{2-}$ | Zn |
| <0.01 | 73.2 | 0.10 | 0.012 | 0.43 | <0.04 | 0.06 | 27.5 | 0.012 |

The ratio of concentrate:laterite for each test was set to between 22.9 and 23.0% to provide the acid required for the leaching of the concentrate and laterite ore. Concentrate, laterite and water were added to the autoclave to target the solids concentration in the aqueous feed slurry for autogeneous operation of a commercial autoclave under the target leaching conditions. This was equivalent to 34.1 to 36.0% solids over the range of 0 to 12% stibnite added.

Figure 15:
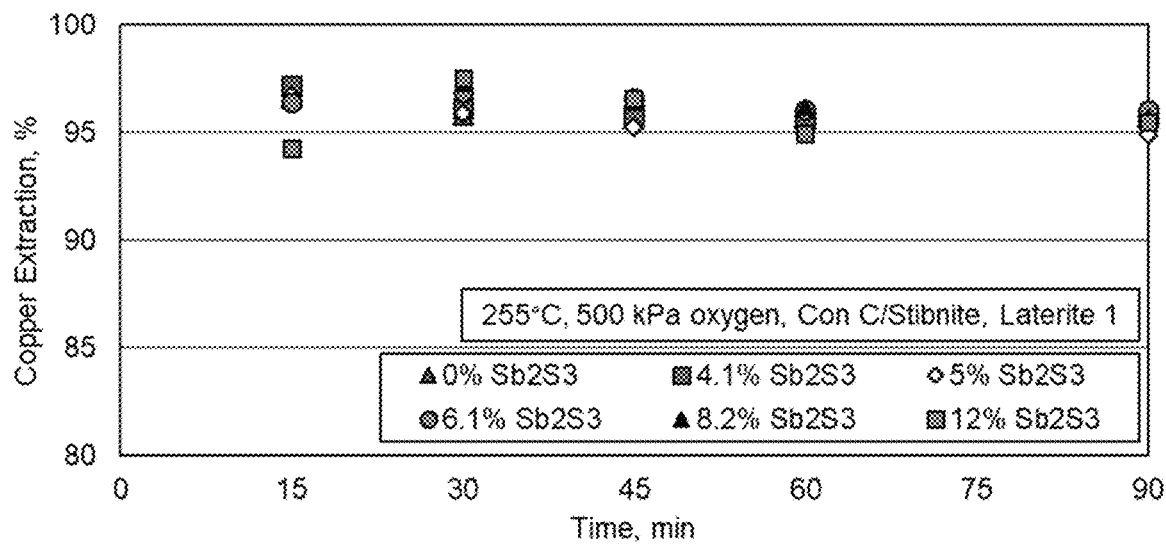
Figure 16:
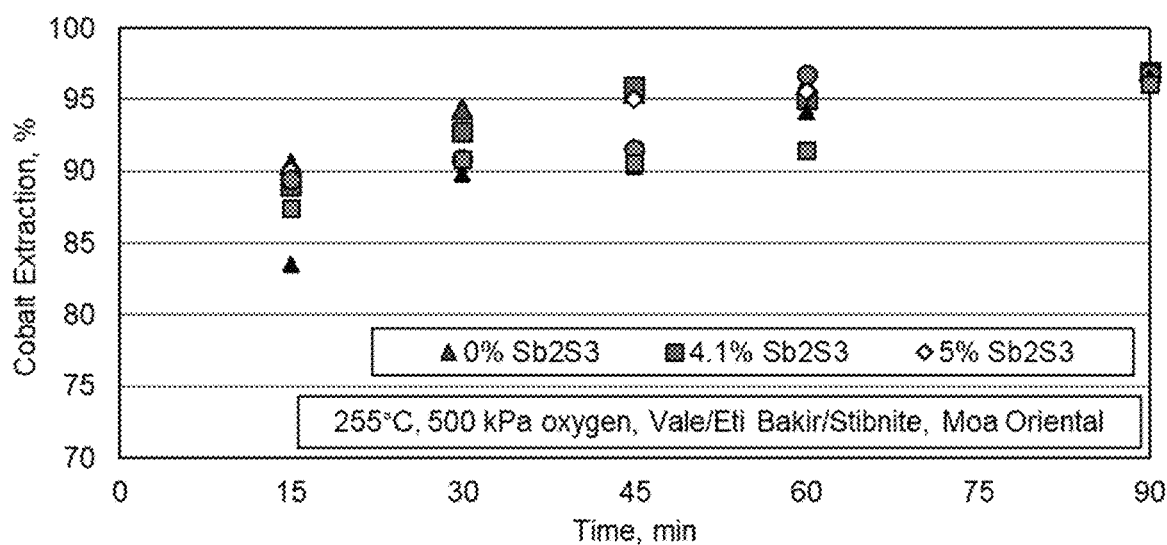
Figure 17:
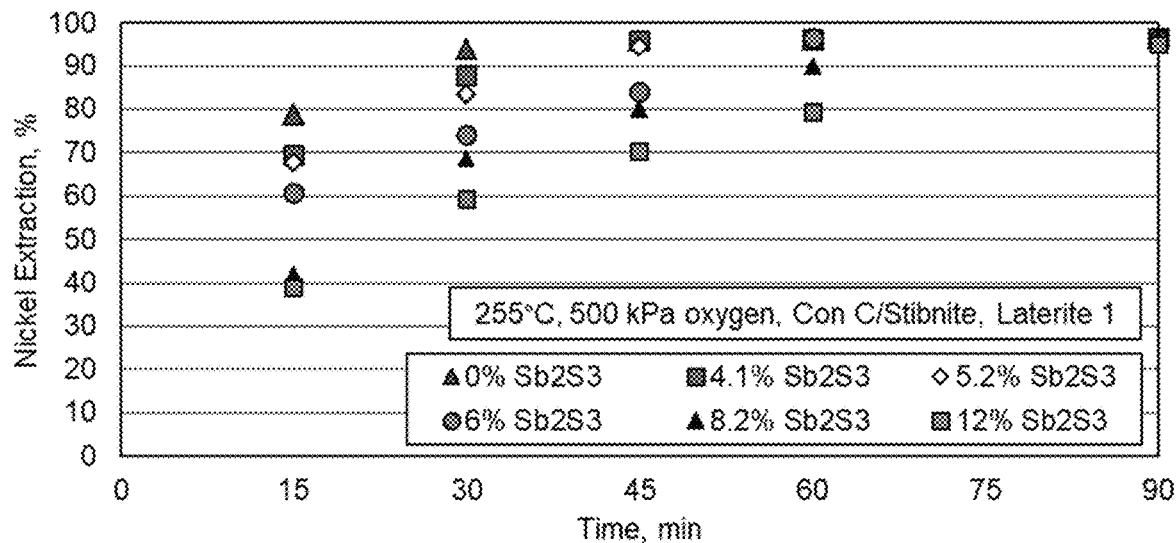

The batch pressure leach tests were performed at 255° C. with an oxygen partial pressure of 500 kPa. The tests were heated to 205° C. and then oxygen was applied. The heat of the oxidation reaction heated the autoclave to the operating temperature and the operating temperature was then maintained using a cooling coil in the autoclave. FIGS. 15 to 17 show the rates of copper, nickel and cobalt extractions for those two series of test (Con A/Con B and Laterite 1, and Con A/Con C and Laterite 2). Leaching of copper from the concentrate was rapid, with over 94% Cu extraction, and generally over 96% copper extraction within 15 minutes. Over 99.5% of the antimony in the feed reported to the pressure leach solids.

The leaching behaviour of cobalt was similar to that in Examples 1 and 2. Two different modes of leaching were observed: rapid initial leaching of cobalt in the first 15 minutes (i.e., leaching of asbolane/asbolite) and continued leaching at longer reaction times (i.e., leaching of cobalt from goethite). The rate and extent of cobalt leaching, particularly from the goethite minerals, decreases as the amount of antimony into the system increased (i.e., a higher percentage of stibnite).

For the nickel extraction, antimony has a similar effect to arsenic, with a decrease in the rate and extent of nickel extraction as the antimony addition to the system increased (i.e., higher percentages of stibnite in the concentrate mixture). Antimony also forms highly stable iron antimonate minerals, which could inhibit the leaching of nickel, if those iron antimonate minerals precipitated on the surface of the goethite and silicate minerals from the laterite ore.

Figure 18:
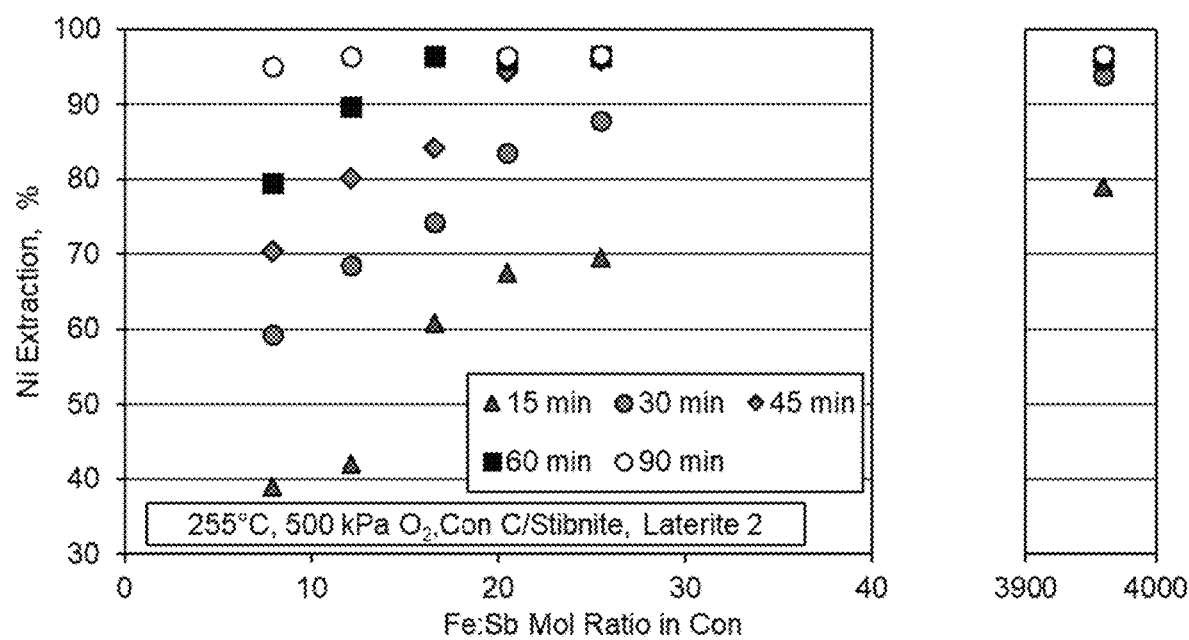

FIG. 18 shows the nickel extraction vs. the Fe:Sb mole ratio in the concentrate for various autoclave reaction times for this laterite ore. A decrease in nickel extraction is observed as the Fe:Sb mole ratio in the concentrate feed decreased all the retention times tested.

The transition point where 95% nickel extraction is reached for various autoclave reaction time was determined from these graphs, and is presented in Table 10 along with the equivalent Sb content for the feeds tested. The reaction time in the batch leach tests is provided, along with an approximation of the continuous retention time, based on past experience in the scale up of pressure leach reactors.

TABLE 10

| Batch Reaction Time, min | 45 | 60 | 90 |
|---|---|---|---|
| Cont. Reaction Time, min | 68 | 90 | 120 |
| Fe:Sb Mol Ratio in Con (for 95% Ni) | 21.4 | 15.2 | <7.9 |
| Sb in Con (for > 95% Ni), wt % | 3.5 | 4.9 | >8.8 |

Thus, this shows that, when processing laterite ores together with sulphide concentrates containing antimony, nickel extractions of over 95% can be achieved by controlling one or both of Fe:Sb mole ratio in the concentrate and the autoclave retention time. This also shows that over 99% of the antimony in the concentrate feed reports to the pressure leach solids.

Example 4

Piloting plant testing (48 h) was performed with Concentrates A and B and Laterite 3 from Example 2. The Fe:As mole ratio in Concentrate A was 4.3 and for was 29.3 for Concentrate B.

Concentrate A Slurry (65 wt % solids) or Concentrate B slurry (71 wt % solids) and Laterite 3 slurry (42.9 wt % solids) were blended and fed into the autoclave as a combined slurry. The slurries were blended to target 22.5% of the total solids for Concentrate A and 32.5% of the total solids as Concentrate B to provide the acid required for the leaching of the concentrate and laterite ore. Assuming 100% of the sulphide sulphur in this slurry is oxidized to generate sulphuric acid, this is equivalent to 292 kg/t of $H_2SO_4$ per tonne of the combined feed (concentrate +laterite) with Concentrate A and 393 kg/t with Concentrate B.

Feed slurry and quench solution were added to give an autoclave solids content in the combined aqueous feed slurry (i.e., concentrate slurry, laterite slurry and quench solution) of 36.9 wt % with Concentrate A and 30.4 wt % with Concentrate B. The average retention time in the autoclave with both concentrates was approximately 73 min.

The blended concentrate and laterite slurries at room temperature were fed continuously into the first compartment of a five-compartment pilot plant autoclave. Oxygen was added to the first compartment and the pressure in the autoclave was controlled to give an oxygen partial pressure of approximately 700 kPa. The heat of the sulphide oxidation reactions provided the heat necessary to heat the incoming feed and maintain the operating temperature in the first autoclave compartment (253° C.). Endothermic reactions from laterite leaching reactions led to a slight cooling of the autoclave in subsequent compartments, with an average temperature of 248° C.

The average extractions of copper, cobalt and nickel with Concentrate A were 96.3%, 97.8% and 95.9%, respectively, while, with Concentrate B, the extractions were 96.4%, 97.8% and 97.0%, respectively.

The average composition of the solution in the autoclave discharge slurry for the two periods of operation was 6.5 g/L Al, 30 to 90 mg/L As, 0.05 to 0.10 g/L Ca, 0.2 g/L $Cr^{3+}$, 0.4 to 0.5 g/L Co, 29 to 49 g/L Cu, 2.1 to 2.2 g/L $Fe^{3+}$, <0.05 g/L $Fe^{2+}$, 0.5 to 0.6 g/L Mg, 2.2 to 2.5 g/L Mn, 3.5 to 4.2 g/L Ni, 0.4 to 0.5 g/L Si, 0.5 to 5.6 g/L Zn and 30 to 46 g/L $H_2SO_4$.

The autoclave discharge slurry was fed to a slurry neutralization circuit operated at 90° C. with a 60 minute retention time. Limestone was added to reduce the free acid concentration in solution to values ranging from 2 to 11 g/L. Under these conditions, no precipitation of copper, nickel or cobalt were observed. However, 44 to 71% of the arsenic and 27 to 33% of the iron in solution precipitated under these conditions, reducing the arsenic concentration typically to less than 20 mg/L.

The slurry neutralization discharge slurry was fed to a seven stage countercurrent decantation wash circuit. The solids in the slurry settled well at low flocculant dosages (i.e., 110 to 120 g/t total for all thickeners). Average underflow pulp densities in the thickeners were 1590 to 1660 g/L and a solids content in the final washed underflow of 48 to 52 wt % solids.

For this pilot plant testwork, the solids, after liquid solid separation and washing, were subjected to Toxicity Characteristic Leaching Procedure (TCLP). Table 11 shows the maximum allowable concentrations in the TCLP leachate and the values from TCLP testing of washed pressure leach residue and final CCD underflow solids. All of the concentrations in the TCLP leachate are very low and most of the elements of concern are below the detection limit.

TABLE 11

| | Concentration in TCLP Leachate, mg/L | | | | | | | |
|---|---|---|---|---|---|---|---|---|
| | As | Ba | Cd | Cr | Pb | Hg | Se | Ag |
| Maximum PL Solids | 5 | 100 | 1 | 5 | 5 | 0.2 | 1 | 5 |
| Con A | <0.01 | <0.01 | <0.01 | 0.03 | <0.01 | <0.02 | <0.02 | <0.01 |
| Con B | <0.01 | <0.01 | <0.01 | 0.01 | <0.01 | <0.02 | <0.02 | <0.01 |
| CCD U/F | | | | | | | | |
| Con A | 0.02 | <0.01 | <0.01 | 0.01 | <0.01 | <0.02 | <0.02 | <0.01 |
| Con B | <0.01 | 0.01 | 0.03 | 0.01 | <0.01 | <0.02 | <0.02 | <0.01 |

This example shows that high metals extractions (>95% Cu, >97% Co, and >95% Ni) can be achieved, while operating continuously with the oxidation of sulphide minerals providing sufficient heat to maintain the autoclave at the target temperature. The resulting slurry can be partially neutralized with limestone to reduce the free acid concentration to 2 to 10 g/L $H_2SO_4$ without coprecipitation of copper, cobalt or nickel. The solution can be recovered in a countercurrent decantation wash circuit while producing washed leach residues which produce TCLP leachates of at least 1 to 2 orders of magnitude lower than the legal limits for each element measured by the TCLP testing.

Example 5

Batch pressure leach tests were performed with a concentrate blend of 37.5%

Concentrate A and 62.5% Concentrate B from Example 1 and one of the oxidizing laterite ores from Example 1 (Laterite 1), but in this series of tests, the blend of Concentrate A/B was blended with varying concentrations of bismuth sulphide ($Bi_2S_3$). The composition of the bismuth sulphide sample is shown in Table 12. Bismuth sulphide was added to target a bismuth concentration in the concentration of 0 to 4.9 wt %.

TABLE 12

| Bismuth Sulphide Analysis, wt % | | | | | | | | |
|---|---|---|---|---|---|---|---|---|
| Al | Sb | As | Bi | Cu | Fe | Si | $S^{2-}$ | Zn |
| <0.10 | <0.30 | <0.20 | 80.9 | <0.1 | 0.1 | <0.1 | 19.1 | <0.1 |

The ratio of concentrate:laterite for each test was set to between 25.1 and 25.5% to provide the acid required for the leaching of the concentrate and laterite ore. Concentrate, laterite and water were added to the autoclave to target the solids concentration in the aqueous feed slurry for autogeneous operation of a commercial autoclave under the target leaching conditions. This was equivalent to 34.1 to 35.4% solids over the range of 0 to 6% bismuth sulphide added.

The batch pressure leach tests were performed at 255° C. with an oxygen partial pressure of 500 kPa. The tests were heated to 205° C. and then oxygen was applied. The heat of the oxidation reaction heated the autoclave to the operating temperature and the operating temperature was then maintained using a cooling coil in the autoclave. Copper and cobalt extractions were over 96% in each test.

Figure 19:
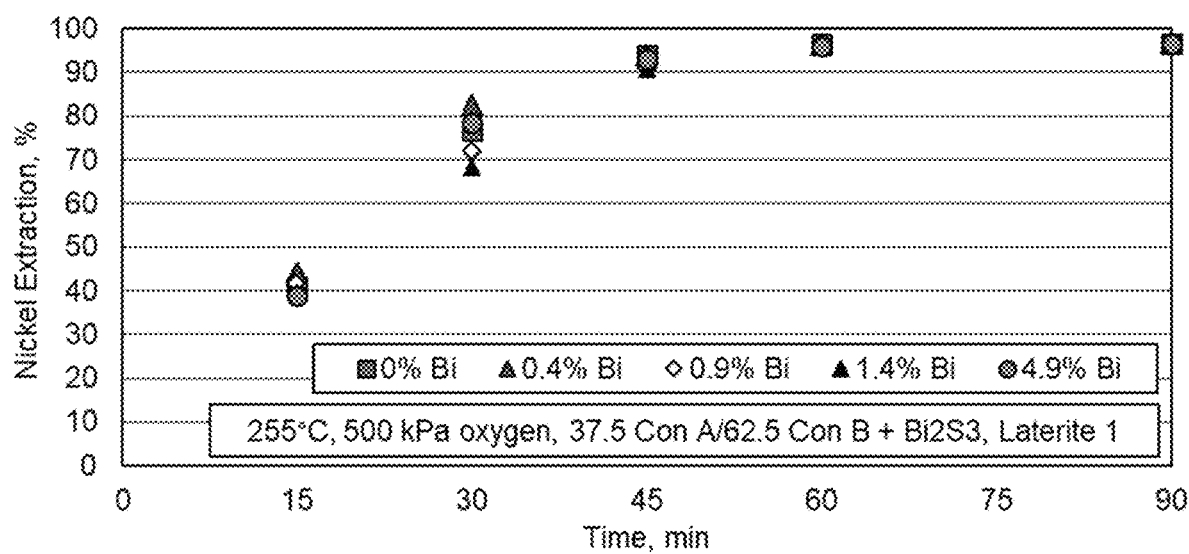

FIG. 19 shows the rate of nickel extraction. Over 95% nickel extraction was reached by the 60 minute sample in all of the tests, with no impact of bismuth on nickel extraction over the range of bismuth concentrations tested in the combined concentrate of (0.02 to 4.9 wt %). Bismuth extraction was between 1 and 7%, meaning that 93 to 99% of the bismuth reported to the pressure leach solids. This demonstrates that nickel extractions of over 95% can be achieved when processing laterite ores together with sulphide concentrates containing bismuth at levels (4.9 wt % Bi) that are almost 100 times higher than smelter limits (i.e., 0.05 wt % Bi), with over 93% of the bismuth in the concentrate feed reporting to the pressure leach solids Example 6

Copper recovery by solvent extraction was modeled for the copper recovery flowsheet as below using two step solvent extraction steps. The two solvent extraction steps are:
  i. Solvent Extraction Step 1 on CCD overflow solution (10 to 30 g/L Cu, 3 g/L $H_2SO_4$);
  ii. Step 1 raffinate treated in solution purification neutralized to neutralize free acid and precipitate aluminum, iron and other impurities from solution (pH 3.5) and a cooling tower to remove calcium and amorphous silica before solvent extraction; and
  iii. Solvent Extraction Step 2 on overflow solution from solution purification.
    The general parameters for the model were as follows:
    30 Vol % ACORGA® M5640 (Solvay S.A.);
    Extraction Stage Organic/Aqueous (O/A) ratio=4;
    Stage efficiency=95%;
    Spent Electrolyte: 35 g/L Cu and 200 g/L $H_2SO_4$; and
    Advance Electrolyte: 45 g/L Cu.

Modeling was performed using 3 stages of extraction and one stage of stripping, with the first two extraction stages (E1 and E2) used on the CCD overflow solution and the latter (E3) on the neutralized raffinate after treatment in solution purification.

Figure 20:
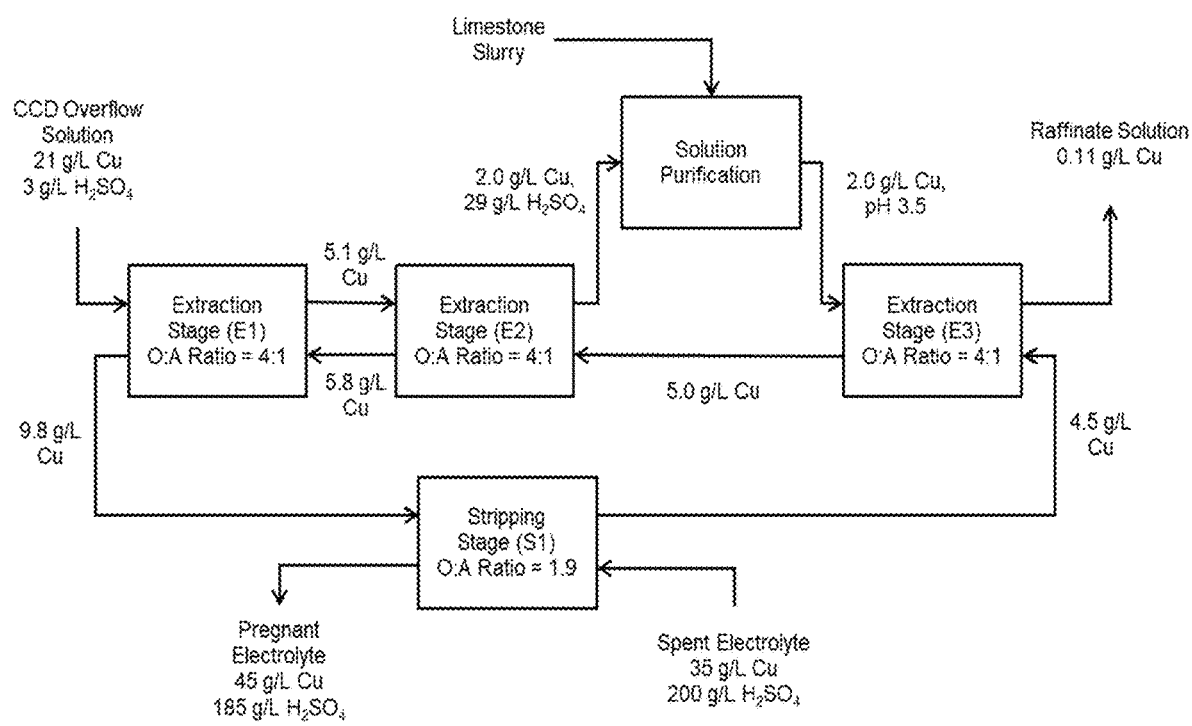

FIG. 20 shows an example of this configuration for CCD overflow solution containing 21 g/L Cu, including copper concentrations in the organic and aqueous streams within that process.

Table 13 shows the effect of copper concentration in the CCD overflow solution on copper recovery in this configuration.

TABLE 13

Modelling Results for 3E + 1S Circuit,
(Acid Neutralization between E2 and E3)

| CCD Overflow, g/L Cu | 10 | 15 | 21 | 25 | 30 |
|---|---|---|---|---|---|
| Final Raffinate, g/L Cu | 0.001 | 0.05 | 0.11 | 0.19 | 0.39 |
| Cu Recovery, % | >99.9 | 99.7 | 99.5 | 99.2 | 98.7 |

The 3E-1S circuit, with neutralization of the raffinate after E2, is effective over a wide range of copper concentrations, with very high copper recoveries >98.5% even at very high copper concentrations in the feed.

For lower copper concentrations (10 to 15 g/L), modelling showed that the O:A ratio in the extraction stage could be lowered (i.e., 2:1 instead of 4:1) and/or the number of extractions stages could be reduced (i.e., 2 extraction stages instead of 3) without lowering the copper recovery below 99%.

Example 7

Copper recovery by solvent extraction was modeled for the following copper recovery flowsheet below, using a single step solvent extraction on neutralized CCD solution:
 i. CCD overflow solution (11 to 18.5 g/L Cu, 3 g/L $H_2SO_4$) treated in solution purification neutralized to neutralize free acid and precipitate aluminum, iron and other impurities from solution (pH 3.5) and a cooling tower to remove calcium and amorphous silica before solvent extraction;
 ii. Single Solvent Extraction Step on overflow solution from solution purification.
  The general parameters for the model were as follows:
  30 Vol % ACORGA M5640;
  Extraction Stage Organic/Aqueous ratio (O/A)=4;
  Stage efficiency=95%;
  Spent Electrolyte: 35 g/L Cu and 200 g/L $H_2SO_4$; and
  Advance Electrolyte: 45 g/L Cu.

Modeling was performed using 3 stages of extraction and one stage of stripping. Table 14 shows the effect of copper concentration in the solution purification overflow solution on copper recovery in this configuration.

TABLE 14

| | Modelling Results for 3E + 1S Circuit, | |
|---|---|---|
| Solution Purification Overflow, g/L Cu | 11 | 18.5 |
| Raffinate, g/L Cu | 0.33 | 0.92 |
| Cu Recovery, % | 97 | 95 |

Copper recoveries above 95% are limited to solutions with 18.5 g/L Cu or less, while copper recoveries of 97% are limited to solutions with 11 g/L Cu or less. In each case, the copper recoveries achieved in this flowsheet and solvent extraction configuration are significantly lower than those for the two step solvent extraction flowsheet described in Example 6.

Example 8

This example models a single step solvent extraction for three cases. In each case, after pressure leaching and flashing of the autoclave discharge slurry, the solution in the discharge slurry from pressure/temperature letdown contains 20 to 60 g/L Cu and 40 g/L $H_2SO_4$.

Case 1: The discharge slurry is fed directly into a seven stage CCD circuit. Wash water in the CCD dilutes the copper and free acid concentrations to 14 to 43 g/L Cu and 28 g/L $H_2SO_4$.

Case 2: Free acid in the discharge slurry is partially neutralized with limestone, reducing the copper and free acid concentrations to 19.5 to 59 g/L Cu and 5 g/L $H_2SO_4$. This slurry is fed directly into a seven stage CCD circuit. Wash water in the CCD dilutes the copper and acid concentrations to 14 to 42 g/L Cu and 3.6 g/L $H_2SO_4$.

Case 3: Free acid in the discharge slurry is partially neutralized with limestone, reducing the copper and free acid concentrations to 19.5 to 59 g/L Cu and 2 to 10 g/L $H2SO_4$. This slurry is fed directly into a seven stage CCD circuit. Wash water in the CCD and solution purification underflow recycle slurries, reduced in free acid in solution purification and reduced in copper concentration in one or more solvent extractions steps, dilutes the copper and free acid concentrations to 9 to 27 g/L Cu and 1 to 4.5 g/L $H_2SO_4$.

The CCD overflow solution from each of these cases is then treated in a single solvent extraction step. The general parameters for the model were as follows:
 30 Vol % ACORGA M5640;
 Extraction Stage Organic/Aqueous ratio (O/A)=4;
 Stage efficiency=95%;
 Spent Electrolyte: 35 g/L Cu and 200 g/L $H_2SO_4$; and
 Advance Electrolyte: 45 g/L Cu.

The modeling results from these cases are shown in Table 15. A single solvent extraction step on the CCD solution was not able to achieve copper recoveries of over 95% across the entire range of copper concentrations. Without partially neutralizing the free acid in solution prior to the CCD (Case 1), copper recoveries were less than 83%. The maximum copper recovery with partial neutralization and CCD dilution alone (Case 2) was 95% at the lowest copper concentration modelled.

TABLE 15

| | Modelling Results for 3E + 1S Circuit, | | | |
|---|---|---|---|---|
| Case No | 1 | | 2 | |
| Feed to CCD, g/L Cu | 20 | 60 | 20 | 60 |
| CCD O/F, g/L Cu | 14 | 43 | 14 | 42 |
| Raffinate, g/L Cu | 2.61 | 12.0 | 0.72 | 6.8 |
| Cu Recovery in SX, % | 83.4 | 71.5 | 95.0 | 83.8 |
| Case No | | 3 | | |
| Feed to CCD, g/L Cu | 20 | | 60 | |
| CCD O/F, g/L Cu | 9 | | 27 | |
| CCD O/F, g/L $H_2SO_4$ | 1 | 4.5 | 1.0 | 4.5 |
| Raffinate, g/L Cu | 0.25 | 0.38 | 2.14 | 2.5 |
| Cu Recovery in SX, % | 97.2 | 95.8 | 92.1 | 90.8 |

The additional dilution introduced by the recycle of the solution purification underflow slurry significantly narrows the range of copper recoveries from solvent extraction, with a range of 90.8 to 97.2% copper recovery over the range of solution composition described in Case 3.

Further modeling showed that, over the range of free acid concentrations indicated above, greater than 95% copper recovery can only be achieved at copper concentrations of less than 10 g/L Cu and at less than 2 g/L Cu for greater than 97% copper recovery. These values are considerably lower than for Example 7, and the copper recoveries are all considerably lower than from the two step solvent extraction flowsheet described in Example 6.

Example 9

Batch sulphide precipitation tests were conducted in a bench scale autoclave. The tests were performed at 90° C. and 50 to 75 kPa $H_2S$ pressure for 60 minutes. Magnesium oxide (95% MgO) was added to these tests as a dry solid, while mixed hydroxide (38.7 wt % Ni, 2.9 wt % Co, 0.8 wt % Zn, 6 wt % Mn, 3 wt % Mg and 4 wt % S) was added as a filter cake containing 47.7 wt % solids.

The composition of the feed solution and the additions of MHP and MgO to each test are shown in Tables 16 and 17, along with the analyses of the final solution, the precipitation efficiency for nickel and cobalt and the composition of the sulphide precipitate. The additions of MHP correspond to additions of 10 g/L Ni and 0.8 g/L Co to the system.

TABLE 16

| Test No. | Feed, g/L | | Addition, g/L | | Final Solution, g/L | | |
|---|---|---|---|---|---|---|---|
|  | Ni | Co | MHP | MgO | Ni | Co | $H_2SO_4$ |
| 1 | 4.1 | 0.5 | 26.4 | — | 0.02 | 0.05 | 6.7 |
| 2 | 4.3 | 0.5 | 26.4 | 4.0 | <0.005 | <0.005 | <0.1 |
| 3 | 12.0 | 1.5 | 26.4 | 4.8 | 0.04 | 0.03 | 5.7 |

TABLE 17

| Test No. | Precipitation[1], % | | Sulphide Precipitate, wt % | | | | |
|---|---|---|---|---|---|---|---|
|  | Ni | Co | Ni | Co | S | Mg | Mn |
| 1 | 99.9 | 95.9 | 55.0 | 4.80 | 38.0 | 0.03 | <0.02 |
| 2 | >99.9 | >99.6 | 54.5 | 5.06 | 37.7 | 0.02 | <0.02 |
| 3 | 99.8 | 98.7 | 54.1 | 4.65 | 36.5 | <0.02 | <0.02 |

[1]Total precipitation of the nickel and cobalt added in the solution and in the MHP solids Nickel and cobalt were precipitated to very high extents of precipitation with the addition of additional nickel and cobalt values in MHP solids. The addition of MgO to neutralize the free acid produced gave higher precipitation efficiencies, and allowed for precipitation of nickel and cobalt to high extents, even from feed solutions with 3 times more nickel and cobalt in the feed solution (i.e., Test 2 vs. Test 3).

Example 10

Cyanidation amenability (CNA) tests were performed on samples of filtered and washed solids from a series of batch pressure leach tests. The feeds to the pressure leach tests consisted of mixtures of one or more of the following copper concentrates (Con A, B or C) and/or refractory gold concentrate (Con E) shown in Table 18, along with various samples of laterite ore. The concentrates were added at a range of 23.5 to 42 wt % of the total feed solids to supply sufficient acid for the leaching reactions. The total solids content in the autoclave charge was adjusted to between 26 and 37 wt % with the addition of water to reflect the solids concentration for autogeneous operation of a commercial autoclave under the leaching conditions.

TABLE 18

|  | Concentrate Feed Analysis, wt % | | | | | | | | Analysis, g/t | |
|---|---|---|---|---|---|---|---|---|---|---|
|  | Al | As | Cu | Fe | Pb | Si | $S^{2-}$ | Zn | Au | Ag |
| Con A | 0.50 | 7.33 | 21.9 | 23.7 | 0.20 | 1.79 | 42.0 | 0.30 | 3.22 | 87 |
| Con B | 0.71 | 1.10 | 25.6 | 24.2 | 0.17 | 3.01 | 35.2 | 3.04 | 1.39 | 158 |
| Con D | 1.07 | 2.63 | 30.3 | 21.6 | 0.43 | 2.80 | 33.6 | 3.05 | 1.57 | 469 |
| Con E | 2.00 | 5.82 | 0.40 | 36.1 | 0.03 | 8.02 | 27.2 | 0.10 | 165 | 36 |

The CNA tests were conducted as low pulp density carbon-in-leach tests at ambient temperature for 24 h in 2 L glass bottles, rotating at a small angle on a roller rig. Samples of filter cakes were repulped in water to give a slurry of about 5 to 15% solids and lime slurry was added to the bottles to adjust the pH to between 10.5 and 11.5 before activated carbon and NaCN (3 g/L) were added.

The results are shown in Table 19. Gold extractions with cyanidation of the pressure leach residues were typically greater than 95%, while the silver extraction by cyanidation varied between 8 and 75%.

TABLE 19

| Test No. | 1 | 2 | 3 | 4 | 5 | 6 | 7 | 8 |
|---|---|---|---|---|---|---|---|---|
| PL Feed Solids, g/t |  |  |  |  |  |  |  |  |
| Au | 0.7 | 0.7 | 0.8 | 0.9 | 0.8 | 0.8 | 0.7 | 0.9 |
| Ag | 21.8 | 89.3 | 100 | 109 | 93.7 | 93.7 | 82.6 | 26.4 |
| CNA Extraction, % |  |  |  |  |  |  |  |  |
| Au | 98.8 | 99.0 | 98.3 | 99.2 | 96.2 | 98.2 | 99.0 | 99.2 |
| Ag | 34.0 | 34.7 | 35.3 | 63.5 | 29.9 | 74.5 | 59.1 | 49.5 |

Example 11

A batch neutralization test was performed to determine the effect of pH on the co-precipitation of nickel, cobalt and copper during the Stage I of solution purification for an embodiment with two stages of copper solvent extraction. This test was performed at 70° C. with the addition of limestone as the neutralizing agent and oxygen added to oxidize ferrous iron to ferric iron. The composition of the feed solution (raffinate from the primary SX step) is provided in Table 20. The extents of precipitation for various elements are shown in Table 21.

TABLE 20

| Primary SX Raffinate Solution Analysis, g/L | | | | | | | | | |
|---|---|---|---|---|---|---|---|---|---|
| Al | Co | Cu | $Fe^{3+}$ | $Fe^{2+}$ | Mg | Mn | Ni | S | $H_2SO_4$ | Zn |
| 3.18 | 0.39 | 2.10 | 1.24 | 0.18 | 4.29 | 3.60 | 3.84 | 29.4 | 32.3 | 1.08 |

TABLE 21

| Precipitation, % | Al | Fe | Ni | Co | Cu |
|---|---|---|---|---|---|
| Slurry pH | | | | | |
| pH 3.7 | 13.3 | 86.7 | 0.1 | 0.1 | 1.3 |
| pH 4.7 | 99.8 | >99.9 | 5.2 | 1.3 | 66.6 |

Operating at pH 3.7 in the Stage I of Solution Purification precipitates essentially all of the ferric iron and a portion of the aluminum, while minimizing the coprecipitation of Ni, Co and Cu. Increasing the pH to pH 4.7 in Stage I of Solution Purification increases the extent of aluminum and iron precipitation, but much more nickel (5.2%) and cobalt (1.3%) are precipitated. Copper is also precipitated at this higher pH, which would remove copper from this solution that could otherwise be recovered in the following solvent extraction step.

The purpose of Stage I of Solution Purification is to neutralize free acid from the raffinate solution (to improve copper recovery from this solution in solvent extraction) and to remove or partial remove impurities from solution prior to recovery of nickel and cobalt by mixed sulphide (MS) or mixed hydroxide (MH) precipitation. For the precipitation of MS, removal of ferric iron is important to minimize the generation of elemental sulphur during reaction with $H_2S$, which contaminates the product. For the precipitation of MH, removal of iron and aluminum are required to achieve a high purity product.

Operating Stage I of Solution Purification at pH 3.5 to 3.8 allows these elements to be removed or partially removed while minimizing the precipitation of nickel, cobalt and copper in this stage.

Example 12

A batch neutralization test was performed to determine the effect of pH on the co-precipitation of nickel, cobalt and copper during the Stage II of solution purification for an embodiment with two stages of copper solvent extraction. This test was performed at 70° C. with the addition of limestone as the neutralizing agent and oxygen added to oxidize ferrous iron to ferric iron. The composition of the feed solution (raffinate from the secondary SX step) is provided in Table 22. The extents of precipitation for various elements are shown in Table 23.

TABLE 22

| Secondary SX Raffinate Solution Analysis, g/L | | | | | | | | | |
|---|---|---|---|---|---|---|---|---|---|
| Al | Co | Cu | $Fe^{2+}$ | Mg | Mn | Ni | S | $H_2SO_4$ | Zn |
| 1.17 | 0.41 | 0.10 | 0.13 | 4.09 | 4.60 | 4.45 | 14.5 | 2.55 | 1.04 |

TABLE 23

| Precipitation, % | Al | Fe | Ni | Co | Cu |
|---|---|---|---|---|---|
| Slurry pH | | | | | |
| pH 4.4 | 95.8 | 60.4 | 0.3 | 0.1 | 6.1 |
| pH 4.9 | >99.7 | >99.2 | 2.2 | 0.6 | 77.2 |
| pH 5.5 | >99.7 | >99.2 | 6.1 | 3.7 | >99.0 |

The purpose of Stage II of Solution Purification is to neutralize free acid from the raffinate solution and remove any remaining impurities that may impact the quality of the MS or MH nickel/cobalt product. For the precipitation of mixed sulphides (MS), removal of aluminum or iron to low levels is not required to produce high purity mixed sulphides, so the main objectives are to neutralize free acid and/or to remove copper from solution prior to mixed sulphide precipitation. For the precipitation of mixed hydroxides (MH), removal of iron and aluminum are required to achieve a high purity product and copper may also need to be removed.

In Stage II of Solution Purification, the majority of the aluminum and ferrous iron precipitate by pH 4.4, with over 99% removal of both elements by pH 4.9.

With the majority of the iron removed in Stage I of Solution Purification, the coprecipitation of nickel and cobalt in Stage II of solution purification is much lower than in Example 11 when the pH is increased above pH 4, even over a wider range of pH (0.3 to 2.2% Ni and 0.1 to 0.6% Co at pH 4.4 to 4.9). Coprecipitation of nickel and cobalt increases significantly above pH 5.

Over this pH range, all or a portion of the copper in solution precipitates. Copper precipitation increases from 6% at pH 4.4, to over 77% at pH 4.9 and to over 99% at pH 5.5. The precipitated copper is recovered with liquid solid separation and returned to the process to redissolve the copper values along with any precipitated nickel and cobalt.

If copper removal is not required prior to MS precipitation, free acid neutralization is the main objective and, thus, Stage II of solution purification can be operated between pH 2 to 4, with limited aluminum and/or iron precipitation and limiting nickel/cobalt precipitation. If copper removal is required, a pH range of pH 4.5 to 5.5 is preferred.

If copper removal is not required prior to MH precipitation, removal of aluminum and iron is the main objective and, thus, Stage II of solution purification can be operated between pH 4.5 to 5 to limit nickel/cobalt precipitation. If copper removal is required, a pH range of pH 4.5 to 5.5 is preferred.

Example 13

A batch neutralization test was performed to determine the effect of pH on the co-precipitation of nickel and cobalt during neutralization of the pressure leach slurry. This test was performed at 80° C. with the addition of limestone as the neutralizing agent. The pressure leach slurry contained 30 wt % solids, with solution and solids with the composition listed in Table 24.

TABLE 24

| Pressure Leach Solution Analysis, g/L | | | | | | | | | | |
|---|---|---|---|---|---|---|---|---|---|---|
| Al | As | Co | Cu | $Fe^{3+}$ | $Fe^{2+}$ | Mg | Mn | Ni | $H_2SO_4$ | Zn |
| 1.66 | 0.35 | 0.19 | 32.7 | 1.02 | 0.17 | 11.9 | 0.97 | 3.74 | 48.7 | 0.42 |

| Pressure Leach Solids Analysis, wt % | | | | | | | | | | |
|---|---|---|---|---|---|---|---|---|---|---|
| Al | As | Co | Cu | Fe | Mg | Mn | Ni | Si | S | Zn |
| 0.92 | 2.64 | 0.005 | 0.40 | 44.5 | 0.71 | 0.04 | 0.12 | 6.65 | 0.78 | 0.03 |

Limestone was added to neutralize free acid in solution and raise the slurry pH to various targets. Once each target was reached, the slurry was maintained at that target and allowed to react for 30 minutes before sampling. Table 25 shows the extents of precipitation for selected elements at each free acid concentration or slurry pH target.

TABLE 25

| Precipitation, % | Al | As | Fe | Ni | Co | Cu |
|---|---|---|---|---|---|---|
| Free Acid, g/L | | | | | | |
| 10 g/L | 2 | 33 | 10 | <0.1 | <0.1 | 0.9 |
| 4 g/L | 4 | 69 | 40 | <0.1 | <0.1 | 1.3 |
| Slurry pH | | | | | | |
| pH 2.6 | 11 | 99 | 88 | <0.1 | <0.1 | 1.8 |
| pH 3.5 | 28 | 99 | 93 | 0.9 | 0.5 | 4.8 |
| pH 4.3 | 97 | >99 | >99 | 3.1 | 1.6 | 54 |

By neutralizing the slurry to a range of 4 to 10 g/L $H_2SO_4$ in solution, up to 40% of the Fe and 69% of the arsenic in solution were precipitated, with <0.1% precipitation of nickel and cobalt.

In contrast, increasing the slurry pH above pH 2.6, without removing the solids by thickening or filtration, led to increased precipitation of copper, cobalt and/or nickel. Without removing the solids before increasing the pH, any precipitated copper, cobalt and/or nickel values are lost to the solids.

The experimental conditions set out above are exemplary only and the invention may be practised under other conditions without departing from the invention.

The word "comprising" is used in its non-limiting sense to mean that items following the word in the sentence are included and that items not specifically mentioned are not excluded. The use of the indefinite article "a" in the claims before an element means that one of the elements is specified, but does not specifically exclude others of the elements being present, unless the context clearly requires that there be one and only one of the elements.

All publications mentioned in this specification are indicative of the level of skill of those skilled in the art to which this invention pertains. All publications are herein incorporated by reference to the same extent as if each individual publication was specifically and individually indicated to be incorporated by reference.

The terms and expressions used herein are used as terms of description and not limitation. There is no intention, in using such terms and expression of excluding equivalents of the features shown and described, it being recognized that the scope of the invention is defined and limited only by the claims.

The invention claimed is:

1. A hydrometallurgical process for the recovery of nickel, cobalt and copper, comprising:
   a) co-processing in a pressure vessel, a feed of a copper-containing sulphide concentrate having a sulphide sulphur concentration of at least 15 wt % and containing one or more of arsenic, antimony, and bismuth, and a feed of a laterite ore containing nickel and cobalt in a pressure oxidative leaching step under conditions including mechanical mixing, introducing oxygen, and controlling the feed of the copper-containing sulphide concentrate, the feed of the laterite ore and the introduced oxygen to produce sulphuric acid to leach nickel, cobalt, copper and acid soluble impurities into a liquid phase of an acidic leach slurry, to precipitate iron compounds and a majority of the one or more of arsenic, antimony and bismuth, if present, as solids, and to produce heat to heat the incoming feeds to a temperature in the pressure vessel above 230° C., and wherein controlling the incoming feeds and the introduced oxygen is conducted so that the sulphur content of the copper-containing sulphide feed produces sufficient sulphuric acid in the pressure vessel to leach the nickel, cobalt, copper and the acid soluble impurities into the liquid phase of the acidic leach slurry;
   b) withdrawing from the pressure vessel, a reacted slurry comprising the liquid phase and the solids;
   c) separating the solids from the liquid phase to produce a pregnant leach solution (PLS) containing the nickel, cobalt, copper and the acid soluble impurities;
   d) conducting a first solution purification stage on the PLS to neutralize at least a portion of free acid and to precipitate one or more impurities selected from iron, aluminum, chromium and silicon, followed by separating as solids, the precipitated impurities and other solids from a first purified solution;
   e) separating copper from the first purified solution with a solvent extraction step to produce a raffinate solution containing the leached nickel and cobalt and reduced in copper and a copper loaded organic phase;
   f) stripping the copper loaded organic phase with an acidic solution to produce a copper loaded solution;
   g) recovering copper from the copper loaded solution with electrowinning;
   h) conducting a second solution purification stage on the raffinate solution from e) by one or both of neutralizing at least a portion of free acid and precipitating one or more impurities selected from iron, aluminum, chromium and silicon, followed by separating as solids, the precipitated impurities and other solids from a second purified solution; and
   i) recovering nickel and cobalt as mixed hydroxides or as mixed sulphides from the second purified solution.

2. The process of claim 1, further comprising, after b) and before separating in step c), conducting a slurry neutralizing step to lower free acid concentration in the liquid phase to a range of 2 to 10 g/L.

3. The process of claim 2, further comprising, after step c), separating copper from the PLS with a solvent extraction step to produce a low copper PLS containing the leached nickel and cobalt for treatment in step d), and a copper loaded organic phase for stripping in step f).

4. The process of claim 3, wherein the first solution purification stage of d) includes partially neutralizing to reduce free acid by one or more of:
   i) neutralizing with a sulphide concentrate containing acid consuming carbonate, separating the solids as a slurry, and returning the slurry to the pressure vessel in step a);
   ii) neutralizing with an acid consuming ore, an oxide material, a hydroxide material or a carbonate material in an atmospheric leach, and removing solids; and
   iii) neutralizing with a neutralizing agent comprising limestone and removing solids.

5. The process of claim 2, wherein the slurry neutralizing step is performed by adding one or both of a neutralizing agent to partially neutralize free acid and an acid consuming material to partially neutralize free acid and to leach additional metal values into the liquid phase.

6. The process of claim 5, wherein the slurry neutralizing step includes partially neutralizing to reduce free acid by one or both of:
   i) neutralizing with a neutralizing agent comprising limestone; and
   ii) neutralizing with an acid consuming ore or oxide material in an atmospheric leach.

7. The process of claim 2, wherein the slurry neutralizing step limits co-precipitation of nickel and cobalt in the presence of iron compounds.

8. The process of claim 1, further comprising controlling the incoming feeds and the introduced oxygen so that the sulphide sulphur content of the feed of the copper-containing sulphide concentrate produces excess acid in the liquid phase in step a), wherein excess acid is in excess of the stoichiometric requirement to leach the acid soluble metals, to dissolve aluminum and precipitate a portion of the aluminum as alunite, and to form magnesium bisulphates at the temperature of the pressure vessel.

9. The process of claim 8, further comprising controlling the incoming feeds and the introduced oxygen so that the sulphide sulphur content of the feed of the copper-containing sulphide concentrate produces at least 20 to 25 g/L excess acid in the liquid phase in step a).

10. The process of claim 1, wherein:
    the copper-containing sulphide concentrate includes arsenic; and
    the process further comprises controlling the feed of the copper-containing sulphide concentrate in step a) to maintain a mole ratio of iron to arsenic (Fe:As) in the feed of the copper-containing sulphide concentrate greater than 4:1 to avoid suppressing leaching of nickel from the laterite feed.

11. The process of claim 1, wherein:
    the copper-containing sulphide concentrate includes antimony; and
    the process further comprises controlling the feed of the copper-containing sulphide concentrate in step a) to maintain a mole ratio of iron to antimony (Fe: Sb) in the feed of the copper-containing sulphide concentrate is controlled to be greater than 8:1 to avoid suppressing leaching of nickel from the laterite feed.

12. The process of claim 1, wherein:
    the copper-containing sulphide concentrate includes bismuth; and
    the process further comprises controlling the feed of the copper-containing sulphide concentrate in step a) so that the feed of the copper-containing sulphide concentrate contains less than 5 wt % bismuth.

13. The process of claim 1, wherein greater than 90% of at least one of the arsenic, antimony and bismuth precipitates as solids in step a).

14. The process of claim 1, further comprising:
    controlling a ratio of the feed of the copper-containing sulphide concentrate and the feed of the laterite ore so that step a) proceeds without added acid and without an external source of heat to the pressure vessel.

15. The process of claim 1, wherein the feed of the copper-containing sulphide concentrate is added to step a) as a slurry with water, wherein the feed of the laterite ore is added to step a) as a slurry with water, and wherein quench solution is added in step a) for temperature control in the range of 230-270° C.

16. The process of claim 1, wherein step a) is conducted at a temperature up to 270° C. and at an oxygen pressure in the range of 200 to 1000 kPa.

17. The process of claim 1, wherein the laterite ore is a limonite ore or a transition ore.

18. The process of claim 1, wherein the separating of step c) is performed by a counter current decantation (CCD) circuit to produce a CCD overflow PLS solution and a CCD underflow slurry.

19. The process of claim 18, further comprising thickening solids from the first and second stages of solution purification, and recycling the thickened solids to the CCD circuit in order to reduce free acid and/or copper in the feed to the solvent extraction step.

20. The process of claim 18, wherein, to limit co-precipitation of nickel and cobalt in the presence of iron compound, the process includes recycling solids from the first and second stages of solution purification, either to the previous stage of solution purification, or to a thickener in the CCD circuit, both operating with sufficient acid to redissolve precipitated nickel and cobalt.

21. The process of claim 20, wherein the first stage of solution purification operates in a pH range of 3.5 to 3.8, and the second stage of solution purification operates in a pH range of 4.5 to 5.5.

22. The process of claim 20, wherein the first stage of solution purification operates in a pH range of 3.5 to 3.8, and the second stage of solution purification operates in a pH range of 2 to 4, and wherein the nickel and cobalt are recovered as mixed sulfide precipitates in step i).

23. The process of claim 18, wherein one or both of gold and silver are recovered from the CCD underflow slurry from the CCD circuit.

24. The process of claim 23, wherein the CCD underflow slurry from the CCD circuit is washed, the pH of the washed underflow slurry is adjusted to a range of 10 to 11.5 with lime, and one or both of the gold and the silver present in solids from the washed underflow slurry are recovered by cyanidation.

25. The process of claim 1, wherein the copper in the first purified solution is below 18 g/L.

26. The process of claim 1, wherein, in step i), the nickel and cobalt are recovered as mixed hydroxide precipitate by adding a base.

27. The process of claim 26, wherein the nickel and cobalt are recovered as mixed hydroxide precipitate in a first stage with one or both of magnesium oxide and sodium hydroxide, and in a second stage with lime, and wherein the solids from the second stage are recycled to the first or second solution purification stage to redissolve precipitated nickel and cobalt.

28. The process of claim 1, wherein, in step i), the nickel and cobalt are recovered as mixed sulphide precipitates by treating with hydrogen sulphide.

29. The process of claim 28, further comprising, in order to neutralize all or a portion of free acid generated by the precipitation of the metals with hydrogen sulphide, adding one or more of:
   i) oxides or hydroxides of one or more of Mg, Mn, Na, K or Al; and
   ii) mixed hydroxides of one or more of Ni, Co and Mn.

30. The process of claim 1, wherein:
the copper-containing sulphide concentrate includes arsenic; and
the process further comprises controlling the feed of the copper-containing sulphide concentrate in step a) to maintain a mole ratio of iron to arsenic (Fe:As) in the feed of the copper-containing sulphide concentrate greater than 7:1 to avoid suppressing leaching of nickel from the laterite feed.

31. The process of claim 1, wherein:
the copper-containing sulphide concentrate includes arsenic; and
the process further comprises controlling the feed of the copper-containing sulphide concentrate in step a) to maintain a mole ratio of iron to arsenic (Fe:As) in the feed of the copper-containing sulphide concentrate greater than 10:1 to avoid suppressing leaching of nickel from the laterite feed.

32. The process of claim 1, wherein:
the copper-containing sulphide concentrate includes antimony; and
the process further comprises controlling the feed of the copper-containing sulphide concentrate in step a) to maintain a mole ratio of iron to antimony (Fe:Sb) in the feed of the copper-containing sulphide concentrate greater than 15:1 to avoid suppressing leaching of nickel from the laterite feed.

33. The process of claim 1, wherein:
the copper-containing sulphide concentrate includes antimony; and
the process further comprises controlling the feed of the copper-containing sulphide concentrate in step a) to maintain a mole ratio of iron to antimony (Fe:Sb) in the feed of the copper-containing sulphide concentrate greater than 21:1 to avoid suppressing leaching of nickel from the laterite feed.

34. The process of claim 1, wherein step a) is conducted at a temperature in the range of 245 to 260° C., and at an oxygen pressure in the range of 300 to 700 kPa.

35. The process of claim 1, wherein the copper in the first purified solution is below 10 g/L.

36. The process of claim 1, wherein the copper-containing sulphide has a sulphide sulphur concentration greater than 20 wt %.

37. The process of claim 1, wherein the copper-containing sulphide concentrate has a sulphide sulphur concentration greater than 25 wt %.

* * * * *

UNITED STATES PATENT AND TRADEMARK OFFICE
CERTIFICATE OF CORRECTION

PATENT NO. : 12,286,686 B2
APPLICATION NO. : 17/184480
DATED : April 29, 2025
INVENTOR(S) : Jan Smit et al.

Page 1 of 1

It is certified that error appears in the above-identified patent and that said Letters Patent is hereby corrected as shown below:

In the Claims

In Column 39, in Claim 9, Line 48, please delete "at least 20 to 25 g/L excess acid" and replace with -- at least 20 g/L excess acid --.

Signed and Sealed this
Fourteenth Day of October, 2025

John A. Squires
*Director of the United States Patent and Trademark Office*